(12) United States Patent
Sugimoto et al.

(10) Patent No.: US 7,969,395 B2
(45) Date of Patent: Jun. 28, 2011

(54) SPATIAL LIGHT MODULATOR AND MIRROR DEVICE

(75) Inventors: Naoya Sugimoto, Tokyo (JP); Yoshihiro Maeda, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 296 days.

(21) Appl. No.: 12/384,021

(22) Filed: Mar. 30, 2009

(65) Prior Publication Data

US 2009/0225237 A1 Sep. 10, 2009

Related U.S. Application Data

(63) Continuation-in-part of application No. 12/072,448, filed on Feb. 25, 2008, now Pat. No. 7,839,561, which is a continuation-in-part of application No. 11/121,543, filed on May 4, 2005, now Pat. No. 7,268,932, and a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860, said application No. 11/121,543 is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/133,718, filed on Jul. 1, 2008.

(51) Int. Cl.
*G09G 3/34* (2006.01)
*G09G 3/20* (2006.01)
*G02B 26/00* (2006.01)

(52) U.S. Cl. ............... 345/84; 345/85; 345/55; 359/292

(58) Field of Classification Search .................... 345/55, 345/84, 85; 359/291, 292, 295
See application file for complete search history.

(56) References Cited

U.S. PATENT DOCUMENTS

| | | | |
|---|---|---|---|
| 4,229,732 A | 10/1980 | Hartstein et al. |
| 4,571,603 A | 2/1986 | Hornbeck et al. |
| 4,969,730 A | 11/1990 | van den Brandt |
| 5,061,049 A | 10/1991 | Hornbeck |
| 5,214,420 A | 5/1993 | Thompson et al. |
| 5,285,407 A | 2/1994 | Gale et al. |
| 5,452,024 A | 9/1995 | Sampsell |
| 5,612,713 A | 3/1997 | Bhuva et al. |
| 5,673,139 A | 9/1997 | Johnson |
| 5,686,939 A | 11/1997 | Millward et al. |
| 6,128,121 A | 10/2000 | Choi et al. |

(Continued)

*Primary Examiner* — David N Spector
(74) *Attorney, Agent, or Firm* — Bo-In Lin

(57) ABSTRACT

The present invention discloses a spatial light modulator includes a plurality of pixel elements disposed on a substrate. Each of the pixel elements comprises a deflectable micromirror. Specifically, instead of SRAM, the spatial light modulator is implemented with a DRAM in each of the pixel elements. The DRAM in each of the pixel elements has a smaller number of transistors than SRAM. The spatial light modulator can be manufactured with smaller pixel size and circuit configuration with improved withstand voltage. Further improvements can also be achieved for manufactured the spatial light modulator with smaller capacitor with better layout configuration for wire connections and control signal transmissions.

14 Claims, 32 Drawing Sheets

U.S. PATENT DOCUMENTS

| | | |
|---|---|---|
| 6,388,661 B1 | 5/2002 | Richards |
| 6,538,800 B2 | 3/2003 | Huibers |
| 6,552,840 B2 | 4/2003 | Knipe |
| 6,570,550 B1 | 5/2003 | Handschy et al. |
| 6,809,977 B1 | 10/2004 | Richards |
| 6,856,447 B2 | 2/2005 | Richards et al. |
| 6,888,521 B1 | 3/2005 | Richards |
| 7,022,249 B2 | 4/2006 | Valette |
| 7,027,205 B2 | 4/2006 | Richards |
| 7,012,592 B2 | 5/2006 | Richards |
| 7,170,483 B2 | 1/2007 | Handschy et al. |
| 7,405,450 B2 | 7/2008 | Lyu et al. |
| 2007/0041078 A1 | 2/2007 | Pan |
| 2007/0126759 A1 | 6/2007 | Hwang |
| 2007/0258124 A1 | 11/2007 | Chen et al. |
| 2007/0258130 A1 | 11/2007 | Chen et al. |
| 2008/0158442 A1* | 7/2008 | Arai et al. ............ 348/771 |
| 2008/0259008 A1* | 10/2008 | Arai et al. ............ 345/84 |
| 2009/0201236 A1* | 8/2009 | Arai et al. ............ 345/84 |

* cited by examiner

| Combination No. | pixel pitch | transistor | capacitor |
|---|---|---|---|
| G1 | 8 μm | withstand. voltage 12V; 2 pcs. | aluminum capacitor; 2 pcs. |
| G2 | 8 μm | withstand. voltage 12V; 1 pc. | poly-capacitor; 1 pc. |
| G3 | 6 μm | withstand. voltage 6V; 2 pcs. | aluminum capacitor; 2 pcs. |
| G4 | 6 μm | withstand. voltage 6V; 1 pc. | poly-capacitor; 1 pc. |

Fig. 7

[Light per 1 time slot]

| | TS1 | TS2 | TS3 | TS4 | TS5 | TS6 | TS7 | TS8 | TS9 |
|---|---|---|---|---|---|---|---|---|---|
| | 1 | 1 | 1 | 1 | 1 | 1 | 0.2 | 0.15 | 0.1 |

451 spans TS1–TS6; 452 spans TS7–TS9.

601 step N+4:

| step N+4 | TS1 | TS2 | TS3 | TS4 | TS5 | TS6 | TS7 | TS8 | TS9 |
|---|---|---|---|---|---|---|---|---|---|
| SF1 | 0 | 0 | 0 | 0 | 1 | 1 | 1 | 1 | 1 |
| SF2 | 0 | 0 | 0 | 0 | 1 | 1 | 1 | 1 | 1 |
| SF3 | 0 | 0 | 0 | 0 | 1 | 1 | 1 | 1 | 1 |
| SF4 | 0 | 0 | 0 | 0 | 1 | 1 | 1 | 1 | 1 |

(602 → SF2, 603 → SF3, 604 → SF4)

Total amount of light  9.8

| step N+3 | TS1 | TS2 | TS3 | TS4 | TS5 | TS6 | TS7 | TS8 | TS9 |
|---|---|---|---|---|---|---|---|---|---|
| SF1 | 0 | 0 | 0 | 0 | 1 | 1 | 1 | 1 | 1 |
| SF2 | 0 | 0 | 0 | 0 | 1 | 1 | 1 | 1 | 1 |
| SF3 | 0 | 0 | 0 | 0 | 1 | 1 | 1 | 1 | 1 |
| SF4 | 0 | 0 | 0 | 0 | 1 | 1 | 1 | 1 | 0 |

Total amount of light  9.7

| step N+2 | TS1 | TS2 | TS3 | TS4 | TS5 | TS6 | TS7 | TS8 | TS9 |
|---|---|---|---|---|---|---|---|---|---|
| SF1 | 0 | 0 | 0 | 0 | 1 | 1 | 1 | 1 | 1 |
| SF2 | 0 | 0 | 0 | 0 | 1 | 1 | 1 | 1 | 1 |
| SF3 | 0 | 0 | 0 | 0 | 1 | 1 | 1 | 1 | 1 |
| SF4 | 0 | 0 | 0 | 0 | 1 | 1 | 1 | 0 | 0 |

Total amount of light  9.55

| step N+1 | TS1 | TS2 | TS3 | TS4 | TS5 | TS6 | TS7 | TS8 | TS9 |
|---|---|---|---|---|---|---|---|---|---|
| SF1 | 0 | 0 | 0 | 0 | 1 | 1 | 1 | 1 | 1 |
| SF2 | 0 | 0 | 0 | 0 | 1 | 1 | 1 | 1 | 1 |
| SF3 | 0 | 0 | 0 | 0 | 1 | 1 | 1 | 1 | 0 |
| SF4 | 0 | 0 | 0 | 0 | 1 | 1 | 1 | 0 | 0 |

Total amount of light  9.45

| step N | TS1 | TS2 | TS3 | TS4 | TS5 | TS6 | TS7 | TS8 | TS9 |
|---|---|---|---|---|---|---|---|---|---|
| SF1 | 0 | 0 | 0 | 0 | 1 | 1 | 1 | 1 | 1 |
| SF2 | 0 | 0 | 0 | 0 | 1 | 1 | 1 | 1 | 1 |
| SF3 | 0 | 0 | 0 | 0 | 1 | 1 | 1 | 0 | 0 |
| SF4 | 0 | 0 | 0 | 0 | 1 | 1 | 1 | 0 | 0 |

Total amount of light  9.3

SPATIAL LIGHT MODULATOR AND MIRROR DEVICE

CROSS REFERENCE TO RELATED APPLICATIONS

This application is a Non-provisional application of a Provisional application 61/133,718 filed on Jul. 1, 2008 and a Continuation in Part (CIP) application of a patent application Ser. No. 12/072,448 filed on Feb. 25, 2008 now U.S. Pat. No. 7,839,561. The Non-provisional application Ser. No. 12/072,448 is a Continuation in Part (CIP) application of U.S. patent application Ser. No. 11/121,543 filed on May 4, 2005, now issued into U.S. Pat. No. 7,268,932. The application Ser. Nos. 12/072,448 and 11/121,543 are further Continuation in part (CIP) applications of three previously filed applications. These three applications are Ser. Nos. 10/698,620 now abandoned; 10/699,140, now issued into U.S. Pat. No. 6,862,127; and Ser. No. 10/699,143, now issued into U.S. Pat. No. 6,903,860. All three patents were filed on Nov. 1, 2003 by one of the applicants of this patent application. The disclosures made in these patent applications are hereby incorporated by reference in this patent application.

BACKGROUND OF THE INVENTION

1. Field of the Invention

The present invention relates general to a display apparatus implemented with a spatial light modulator. More particularly, this invention relates to an improved pixel element configuration manufactured with DRAM for each pixel element to reduce production cost and further manufacturing the spatial light modulator with more compact size and improved performance characteristics.

2. Description of the Related Art

After the dominance of CRT technology in the display industry for over 100 years, Flat Panel Displays (hereafter FPD) and Projection Displays have gained popularity because the FDP display implements a more compact image projecting system while projecting images on a larger display screen. Of several types of projection displays, projection displays using micro-displays are gaining recognition among consumers because of their high picture quality and a lower cost than FPDs. There are two types of micro-displays used for projection displays on the market, i.e., micro-LCDs (Liquid Crystal Displays) and micromirror technology. Because the micromirror devices display images with an unpolarized light, the images projected by the micromirror device have a brightness superior to that of micro-LCDs, which use polarized light.

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

Electromechanical micromirror devices have drawn considerable interest because of their application as spatial light modulators (SLMs). A spatial light modulator requires an array of a relatively large number of micromirrors and each of these micromirrors are controlled for modulating and projecting a display pixel. Depending on the resolution requirements of the displayed images, the number of required micromirrors ranges from 60,000 to several million for each SLM.

In FIG. 1A, a digital video system 1 includes a display screen 2 disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47; each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme as that implemented in the U.S. Pat. No. 5,214,420, and in most conventional display systems, impose a limitation on the quality of the display. Specifically, applying the conventional configuration of a control circuit limits the gray scale gradations produced in a conventional system (PWM between ON and OFF states) limited by the LSB (least significant bit, or the least pulse width). Due to the ON-OFF states implemented in the conventional systems, there is no way of providing a shorter pulse width than the duration represented by the LSB. The least intensity of light, which determines the gray scale, is the light reflected during the least pulse width. The limited levels of the gray scale lead to a degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states, that include a state 1 when Node A is high and Node B is low and a state 2 when Node A is low and Node B is high.

FIG. 1A shows the operations of the switching between the dual states, as illustrated by the control circuit, to position the micromirrors in an ON or an OFF angular orientation. The brightness, i.e., the gray scales of a digitally controlled image system is determined by the length of time the micromirror stays in an ON position. The length of time a micromirror is in an ON position is controlled by a multiple bit word.

Meanwhile, U.S. Pat. No. 5,083,857 has disclosed a technique of fixing a micromirror to a torsion hinge in a layer that is different from the layer in which the micromirror is formed, by way of a beam support post, thereby attempting to enlarge the moving range of the micromirror and to reduce the pixel size.

However, in these conventional techniques, if each pixel is equipped with Static Random Access Memory (SRAM) and if an ON/OFF control for the pixel is performed together with the bias-driving of the micromirror, there will be a technical problem in that one piece of SRAM requires at least five transistors, which need to be accommodated in the region of the pixel. Consequently, the size of the pixel cannot be reduced, resulting in increasing the size of a silicon substrate (i.e., a chip size) with an increase in the number of required pixels. This in turn increases the cost of a display device while making it difficult to reduce the size of a display apparatus.

It is also possible to reduce pixel size with a three-dimensional layout, in which a plurality of transistors is placed in layers in the vertical direction. However, this technique increases the number of masks in the photolithography process and thus complicates the production process and increases the cost of the display device.

Furthermore, for a high definition and high density pixel configuration, wirings used for controlling transistors cannot be made thick enough, and consequently, the drive speed of the transistors, that is, the micromirror, is reduced due to stray capacitance and wiring resistance. Thus the performance of the display device is not improved.

SUMMARY OF THE INVENTION

Therefore, one aspect of the present invention is to provide a spatial light modulator and a mirror device to achieve improved miniaturization and performance characteristics manufactured with a low production cost. A display system with spatial light modulator can therefore be provided with a reduce cost, impact size and high performance characteristics.

The present invention discloses a spatial light modulator includes a plurality of pixel elements disposed on a substrate. Each of the pixel elements comprises a deflectable micromirror. Specifically, instead of SRAM, the spatial light modulator is implemented with a DRAM in each of the pixel elements. The DRAM in each of the pixel elements has a smaller number of transistors than SRAM. The spatial light modulator can be manufactured with smaller pixel size and circuit configuration with improved withstand voltage. Further improvements can also be achieved for manufactured the spatial light modulator with smaller capacitor with better layout configuration for wire connections and control signal transmissions.

A first exemplary embodiment of the present invention provides a display device, comprising:
a plurality of pixel elements disposed on a substrate; and a drive circuit corresponding to each of the pixel elements, a first wire connected to the drive circuits along a horizontal direction constituting a ROW of the pixel elements wherein the first wire is disposed on a first layer as part of an integrated circuit (IC), and a second wire disposed on a second layer different from the first layer wherein the second wire is approximately overlapped and electrically connected to the first wire.

A second exemplary embodiment of the present invention provides the display device according to the first exemplary embodiment, wherein the drive circuit includes a transistor comprising a gate; and the gate in each of the pixel elements connected as a gate line constituting and functioning as the first wire.

A third exemplary embodiment of the present invention provides the display device according to the first exemplary embodiment, wherein the first and second wires are interconnected through at least a connection point disposed in each of the pixel elements.

A fourth exemplary embodiment of the present invention provides the display device according to the first exemplary embodiment, wherein the first wire and the second wired are provided to transmit signals for simultaneously controlling a plurality of pixel elements.

A fifth exemplary embodiment of the present invention provides a display device according to the first exemplary embodiment, wherein the display device comprises a mirror device includes a micromirror in each of the pixel elements.

A sixth exemplary embodiment of the present invention provides a mirror device, comprising: a plurality of pixel elements disposed on a substrate as a pixel element array wherein each pixel element further comprises a micromirror; each of the pixel elements includes a transistor and a capacitor for applying an electric signal thereon to control the micromirror to operate in a deflecting angle, wherein a pitch of the pixel element is less than or equal to 1.5 times an active area of the transistor in a longitudinal direction.

A seventh exemplary embodiment of the present invention provides the mirror device according to the sixth exemplary embodiment, wherein the pixel element comprises at least two pieces of the transistors, the capacitor has a Metal-Insulator-Metal (MIM) structure, and a pitch of the pixel element is less than or equal to 9 micrometers.

An eighth exemplary embodiment of the present invention provides the mirror device according to the sixth exemplary embodiment, wherein the pixel element comprises one piece of the transistor, the capacitor has a poly-silicon plate, and a pitch of the pixel elements is less than or equal to 9 micrometers.

A ninth exemplary embodiment of the present invention provides a mirror device, comprising: a plurality of pixel elements disposed on a substrate as a pixel element array wherein each of the pixel elements comprises a micromirror; each of the pixel elements further comprises a transistor and a capacitor to receive signals for controlling a deflecting operation of the micromirror, wherein the pitch of the pixel elements is the same as a size of a field area of the transistor in a longitudinal direction or is two times a dimension of a cross section of the transistor.

A tenth exemplary embodiment of the present invention provides the mirror device according to the ninth exemplary embodiment wherein the pixel element comprises at least two pieces of the transistors, the capacitor has a Metal-Insulator-Metal (MIM) structure, and a pitch of the pixel elements is less than or equal to 9 micrometers.

An eleventh exemplary embodiment of the present invention provides a mirror device according to the ninth exemplary embodiment wherein the pixel element comprises one piece of the transistor, the capacitor has a poly-silicon plate, and a pitch of the pixel elements is less than or equal to 9 micrometers.

A twelfth exemplary embodiment of the present invention provides a mirror device, comprising: a plurality of pixel elements disposed on a substrate as a pixel element array wherein each of said pixel elements comprising a micromirror; each of the pixel element further includes a transistor and a capacitor for receiving a signal to control a deflecting angle of the micromirror, wherein a sum of an area of a field area of the transistor and an area of a field area of the capacitor is greater than or equal to an area of the pixel element.

A thirteenth exemplary embodiment of the present invention provides the mirror device according to the twelfth exemplary embodiment wherein the pixel element comprises at least two pieces of the transistors, the capacitor has a Metal-Insulator-Metal (MIM) structure, and a pitch of the pixel elements is less than or equal to 9 micrometers.

A fourteenth exemplary embodiment of the present invention provides the mirror device according to the twelfth exemplary embodiment wherein the pixel element comprises one piece of the transistor, the capacitor has a poly-silicon plate, and a pitch of the pixel elements is less than or equal to 9 micrometers.

BRIEF DESCRIPTION OF THE DRAWINGS

The present invention is described in detail below with reference to the following Figures.

FIG. 7 is a table showing an exemplary specification of the element structure of a spatial light modulator constituting a display system according to a preferred embodiment of the present invention;

FIG. 27 is a data table exemplifying control data for a time slot in order to obtain a linear gray scale representation in the case of the oscillation characteristic shown in FIG. 26C.

DESCRIPTION OF THE PREFERRED EMBODIMENTS

The following is a description, in detail, of the preferred embodiment of the present invention with reference to the accompanying drawings.

Figure 1A:
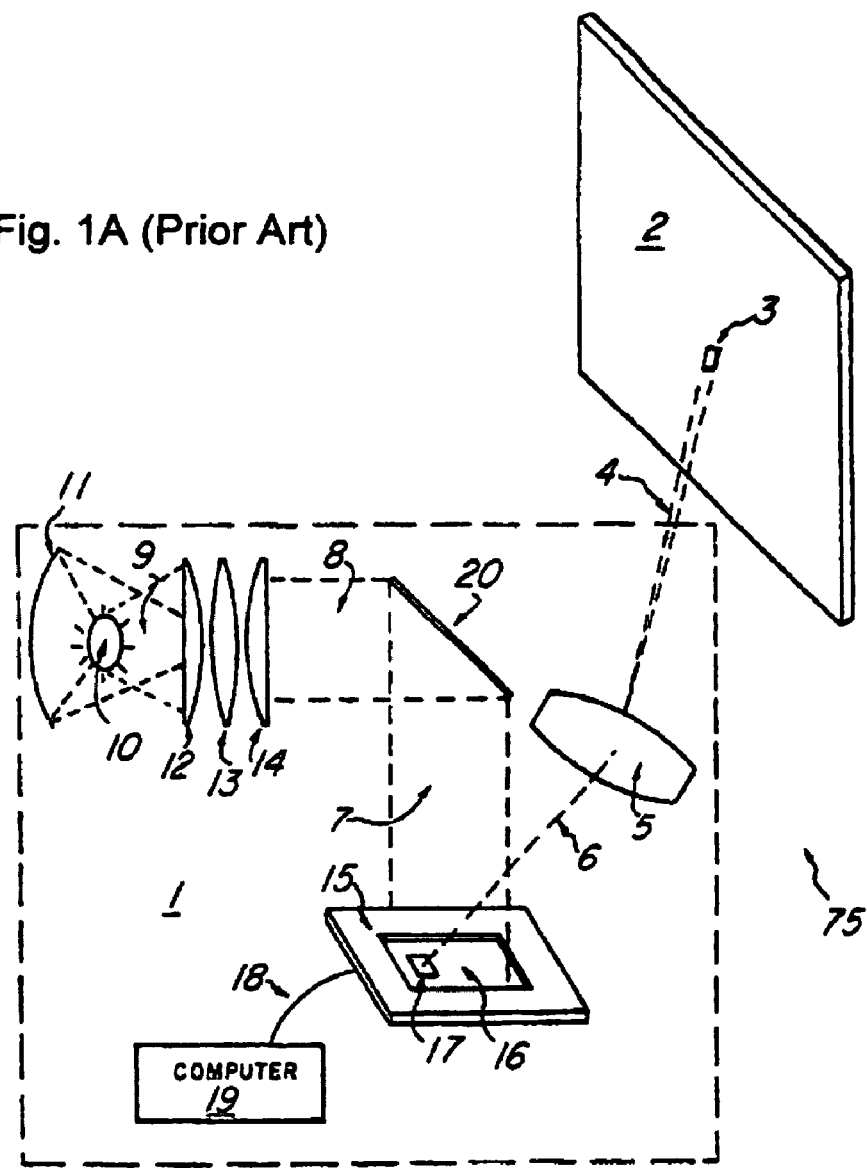
FIG. 1A illustrates the basic principle of a projection display using a micromirror device, as disclosed in a prior art patent.
Figure 1B:
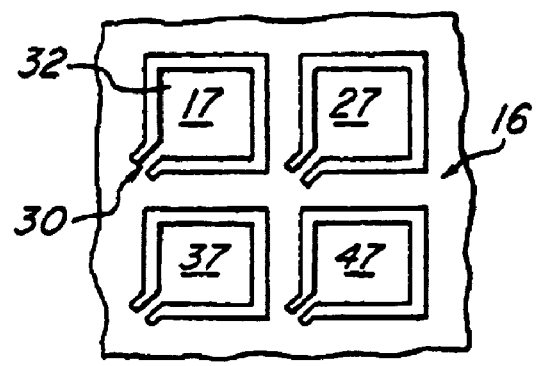
FIG. 1B is a top view diagram showing the configuration of mirror elements of a portion of a micromirror array of a projection apparatus disclosed in a prior art patent.
Figure 1C:
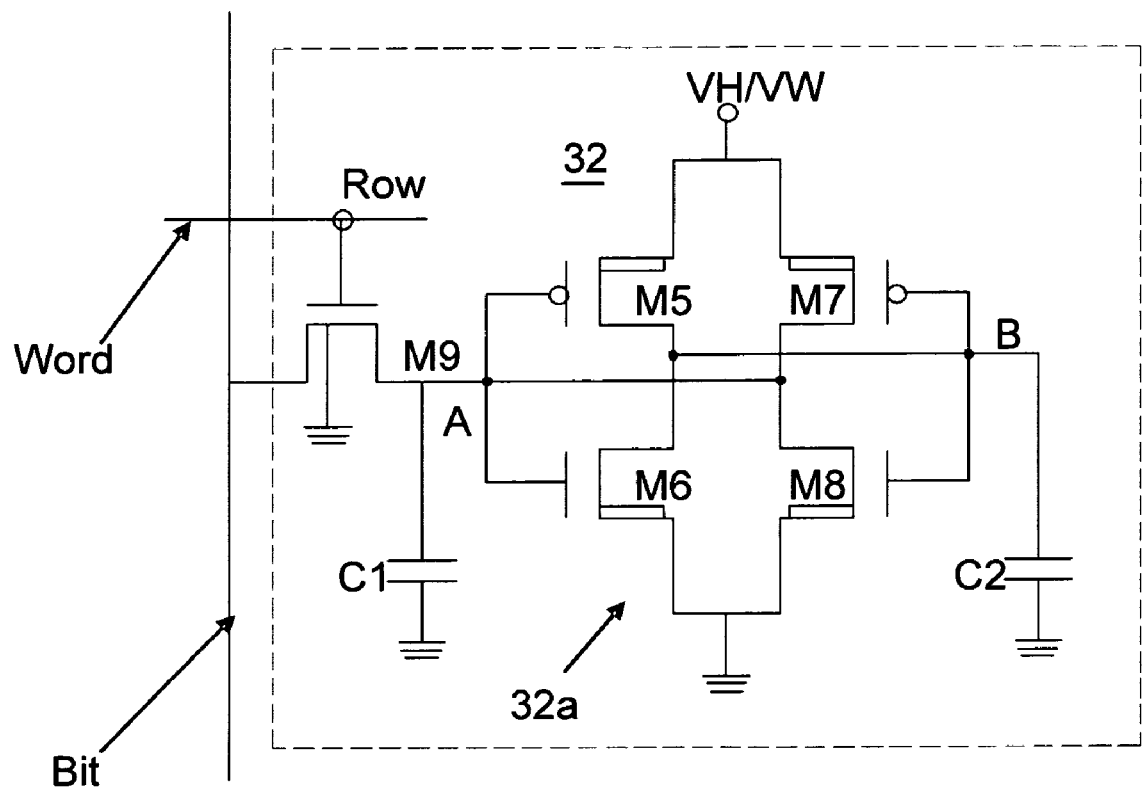
FIG. 1C is a circuit diagram showing the configuration of a drive circuit of mirror elements of a projection apparatus disclosed in a prior art patent.
Figure 2:
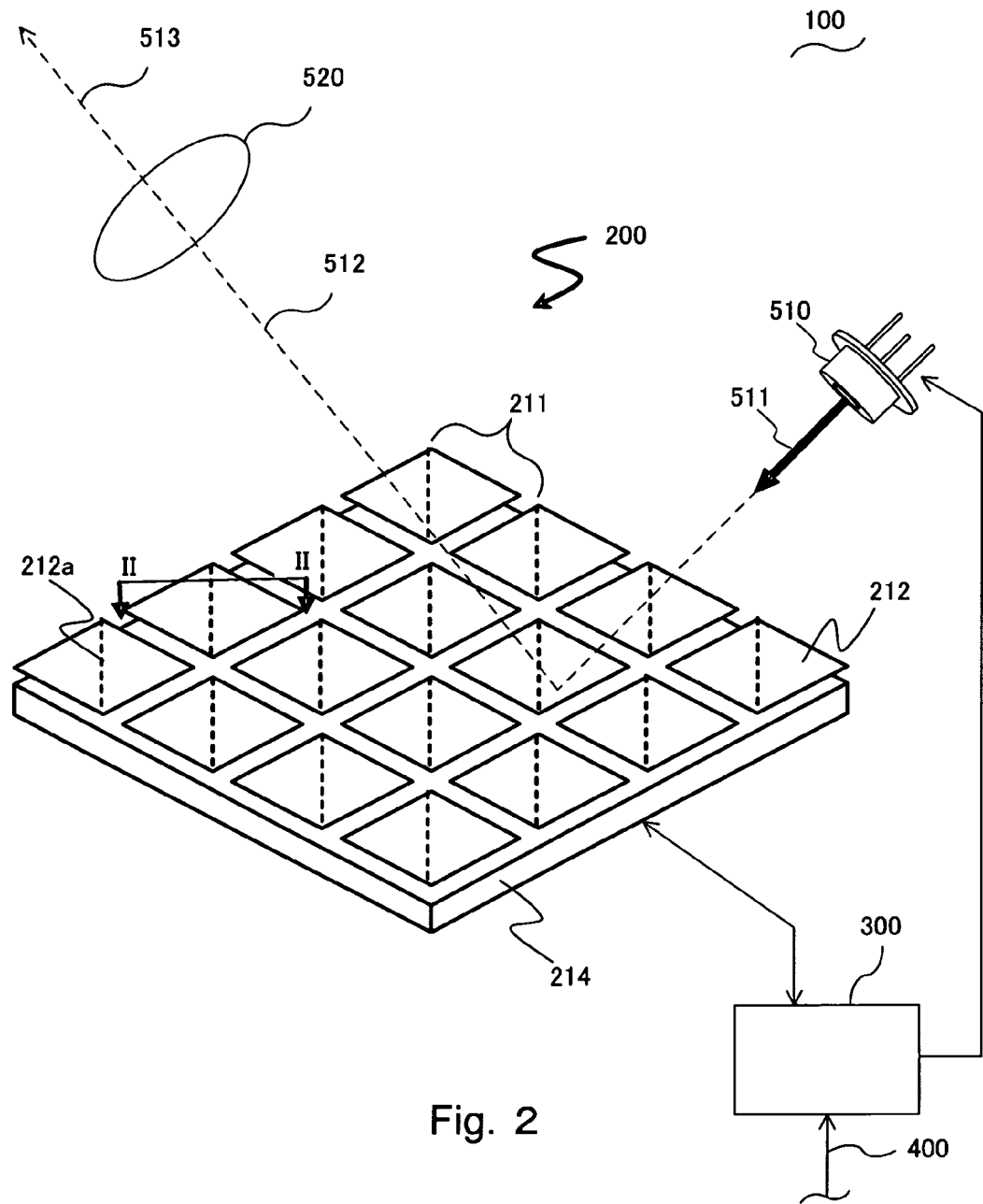
FIG. 2 is a top view for showing a diagonal perspective view of a part of the configuration of a spatial light modulator constituting a display system according to a preferred embodiment of the present invention.

FIG. 2 is a top view diagram showing a diagonal perspective view of a mirror device according to a preferred embodiment of the present invention in which the mirror device is incorporated in a projection system as a spatial light modulator.

The projection apparatus 100 including a spatial light modulator 200 according to the present embodiment comprises a control apparatus 300, light source 510 and projection optical system 520.

As shown in FIG. 2, the spatial light modulator 200 is configured to arrange, cross-wise in two dimensions on a substrate 214, a plurality of pixel units 211, each of which is constituted by an address electrode (not shown), an elastic hinge (not shown) and a mirror supported by the elastic hinge. In the configuration shown in FIG. 2, the pixel units 211 each comprising a square mirror 212 are arranged cross-wise in specific intervals in two dimensions (noted as "arrayed" hereinafter) on a substrate 214.

The mirror 212 of one pixel unit 211 is controlled by applying a voltage to an address electrode or address electrodes placed on the substrate 214.

Furthermore, the pitch (i.e., the interval) between adjacent mirrors 212 is preferably between 4 μm and 14 μm, or more preferably between 5 μm and 10 μm, in view of the number of pixels required for various levels from a 2048×4096 super high definition television (super HD TV) to a non-full HD TV. The "pitch" is the distance between the respective deflection axes of adjacent mirrors 212.

That is, the area of the mirror 212 can be between 16 μm² and 196 μm², or more preferably between 25 μm² and 100 μm².

More specifically the form of the mirror 212 or the pitch between the mirrors 212 is not limited to these values.

FIG. 2 indicates the deflection axis 212a, about which a mirror 212 is deflected, by a dotted line. The light emitted from a coherent light source 510 is directed towards the mirror 212 in an orthogonal or diagonal direction in relation to the deflection axis 212a. The coherent light source 510 is, for example, a laser light source.

Figure 3:
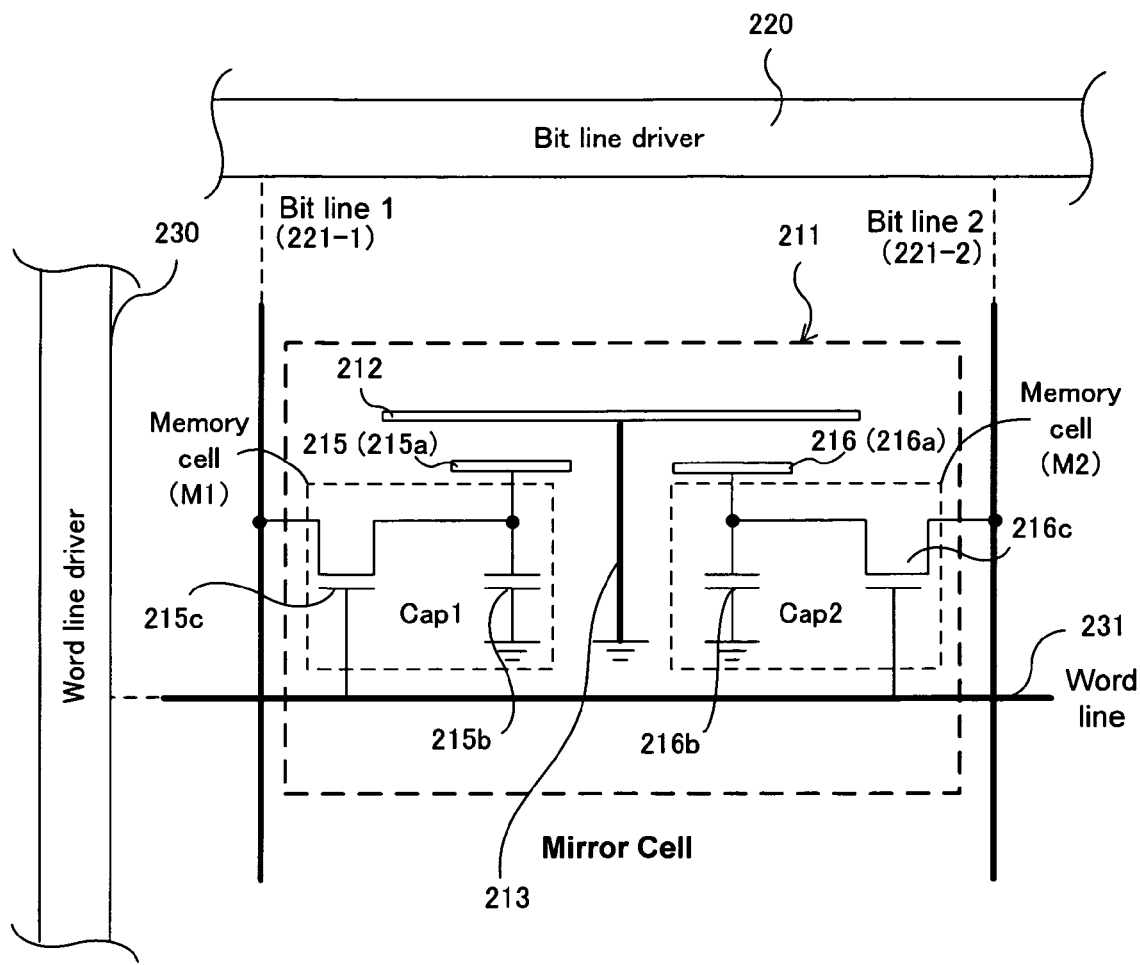
FIG. 3 is an outline diagram of a cross-section, along the line II-II, of one mirror element of the spatial light modulator shown in FIG. 2.

The following provides a description of the comprisal and operation of one pixel unit 211. FIG. 3 is an outline diagram of a cross-section, viewed as indicated by the line II-II in FIG. 2, of one mirror element of the spatial light modulator 200.

As exemplified in FIG. 3, the spatial light modulator 200 according to the present embodiment comprises a pixel array 210, a bit line driver unit 220 and a word line driver unit 230.

In the pixel array 210, a plurality of pixel units 211 is positioned in a grid where each individual bit line 221, extending vertically from the bit line driver unit 220, intersect each individual word line 231, extending horizontally from the word line driver unit 230.

As exemplified in FIG. 3, each pixel unit 211 comprises a mirror 212 which tilts freely while supported on the substrate 214 by a hinge 213.

An OFF electrode 215 (and an OFF stopper 215a) and the ON electrode 216 (and an ON stopper 216a) are positioned symmetrically across the hinge 213 that comprises a hinge electrode 213a on the substrate 214.

When a predetermined voltage is applied to the OFF electrode 215, it attracts the mirror 212 with a Coulomb force and tilts the mirror 212 so that it abuts the OFF stopper 215a. This causes the incident light 511 to be reflected to the light path of an OFF position, which is not aligned with the optical axis of the projection optical system 130.

When a predetermined voltage is applied to the ON electrode 216, it attracts the mirror 212 with a Coulomb force and tilts the mirror 212 so that it abuts the ON stopper 216a. This causes the incident light 311 to be reflected to the light path of an ON position, which is aligned with the optical axis of the projection optical system 130.

An OFF capacitor 215b is connected to the OFF electrode 215 and to the bit line 221-1 by way of a gate transistor 215c that is constituted by a field effect transistor (FET) and the like. Furthermore, an ON capacitor 216b is connected to the ON electrode 216, and to the bit line 221-2 by way of a gate transistor 216c, which is constituted by a field effect transistor (FET) and the like. The opening and closing of the gate transistor 215c and gate transistor 216c are controlled with the word line 231.

Specifically, one horizontal row of pixel units 211 that are lined up with an arbitrary word line 231 are simultaneously selected, and the charging and discharging of capacitance to and from the OFF capacitor 215b and ON capacitor 216b are controlled by way of the bit lines 221-1 and 221-2, and thereby the individual ON/OFF controls of the micromirrors 212 of the respective pixel units 211 of one horizontal row are carried out.

In other words, the OFF capacitor 215b and gate transistor 215c on the side of the OFF electrode 215 constitute a memory cell M1 that is a so called DRAM structure.

Likewise, the ON capacitor 216b and gate transistor 216c on the side of the ON electrode 216 constitute a DRAM-structured memory cell M2.

With this configuration, the tilting operation of the mirror 212 is controlled in accordance with the presence and absence of data written to the respective memory cells of the OFF electrode 215 and ON electrode 216.

The light source 510 illuminates the spatial light modulator 200 with the incident light 511, which is reflected by the individual micromirrors 212 as a reflection light 512. The reflection light 512 then passes through a projection optical system 520 and is projected, as projection light 513.

A control apparatus 300, according to the present embodiment, controlling the spatial light modulator 200 uses the ON/OFF states (i.e., an ON/OFF modulation) and oscillating state (i.e., an oscillation modulation) of the mirror 212, thereby attaining an intermediate gray scale.

More specifically, the following description denotes the combinations of the ON/OFF states of the OFF electrode 215 and ON electrode 216 as (0, 1), (1, 0), et cetera, where ON=1 and OFF=0.

Figure 4:
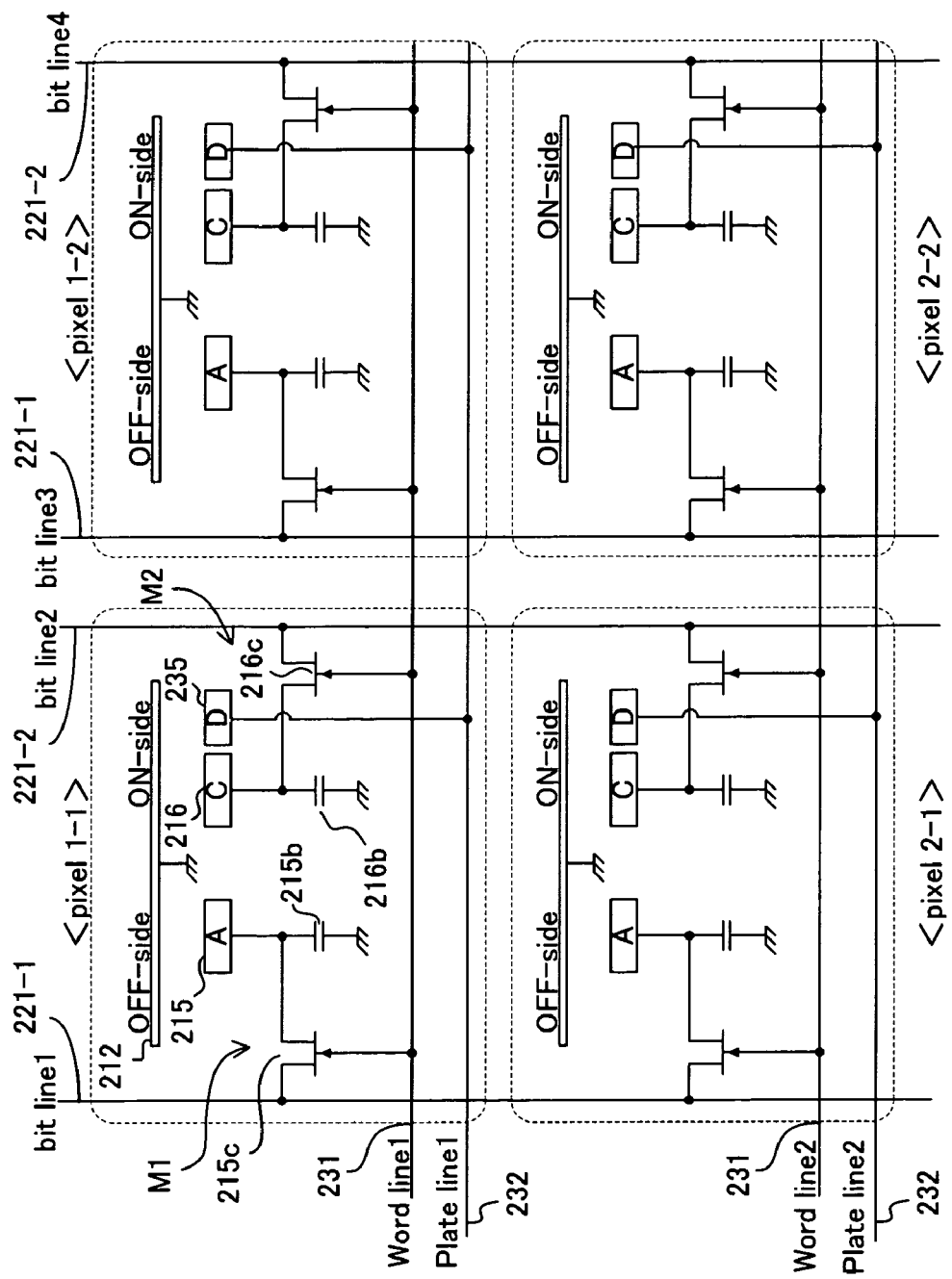
FIG. 4 is a functional circuit diagram showing an exemplary configuration of a pixel unit constituting a pixel array of a spatial light modulator according to a preferred embodiment of the present invention.

Next is a description of the pixel unit 211 that constitutes the pixel array 210 of the spatial light modulator 200 according to the present embodiment, with reference to FIG. 4, with the above described configuration in mind.

In contrast to the pixel unit 211 according to the configuration shown in the FIG. 3, in which one pixel is equipped with one mirror, two electrodes and two DRAM-structured memory cells, the configuration exemplified in FIG. 4 is configured to add plate lines 232 (PL-n; where "n" is the number of ROW lines) to each ROW line and position the second ON electrode 235 (i.e., the electrode D) connected to the plate lines 232 close to the ON electrode 216.

In the case of each pixel unit 211 constituting the pixel array 210 according to the present embodiment, a memory cell on one side, the memory for controlling the mirror 212, is a simple DRAM-structured requiring only one transistor, and therefore, it is possible to suppress the structure of the memory cell from becoming large even with the addition of the plate line 232 and second ON electrode 235. Therefore a high definition projection image may be achieved by arraying a large number of pixel units 211 within a pixel array 210 of a more limited size.

Furthermore, as described below, a gray scale representation may be drastically expanded by the addition of the plate line 232 and second ON electrode 235.

In other words, image projection with a high definition and a high grade of gray scale may be achieved by applying a projection technique implemented with a spatial light modulator with a configuration and control process described according to the spatial light modulator 200.

Figure 5:
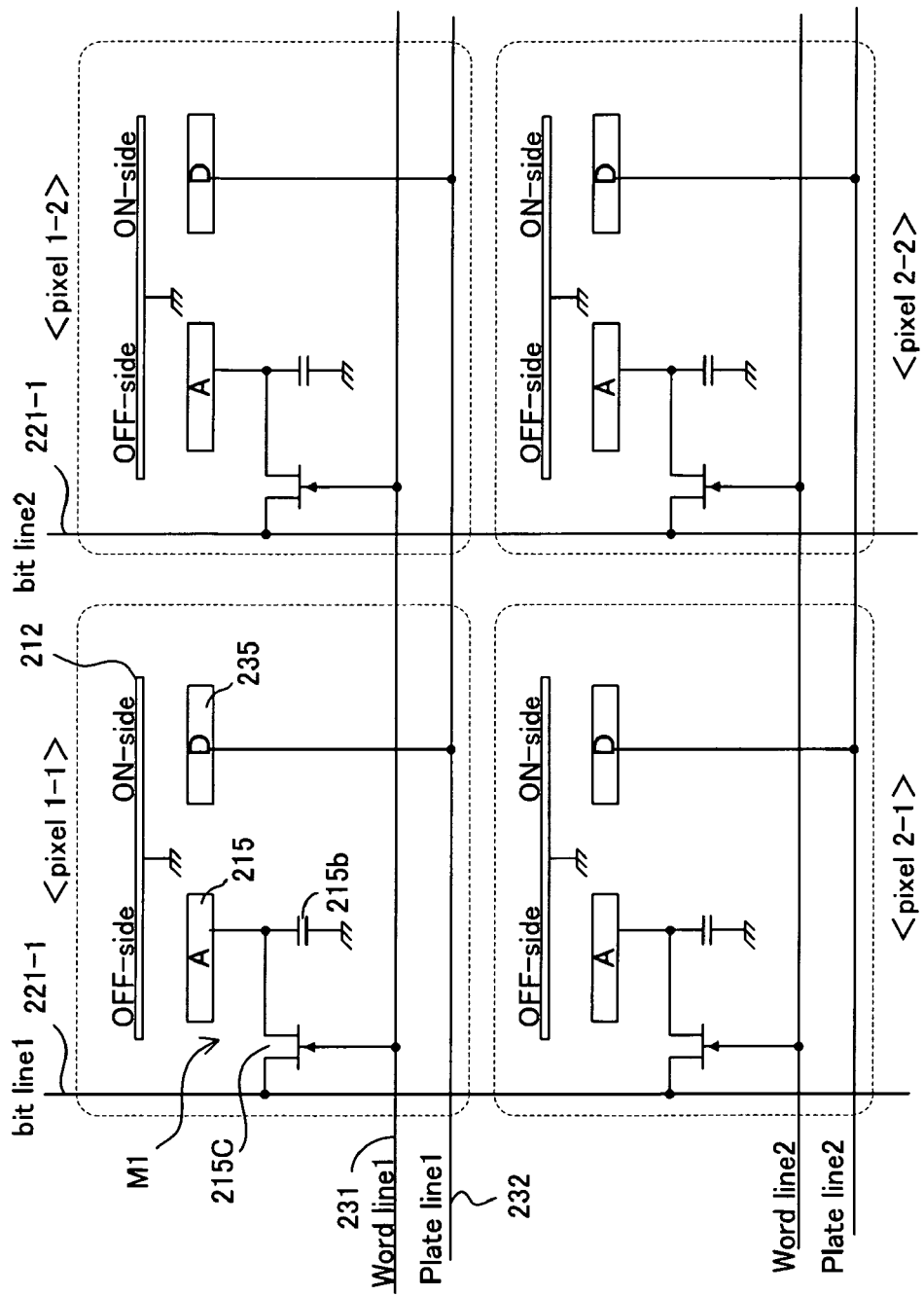
FIG. 5 is a functional circuit diagram showing an exemplary modification of the circuit configuration of the pixel unit exemplified in FIG. 4.

FIG. 5 is a functional circuit diagram showing an exemplary modification of the circuit configuration of the pixel unit exemplified in FIG. 4.

The circuit of a pixel unit 211, according to the exemplary modification shown in FIG. 5, is configured such that the ON electrode 216 (i.e., the electrode C in FIG. 4) and memory cell M2 are removed from the comprisal of FIG. 4 and such that the control for the ON side of the mirror 212 is carried out using the second ON electrode 235 (i.e., an electrode D) connected to the plate line 232.

Figure 6:
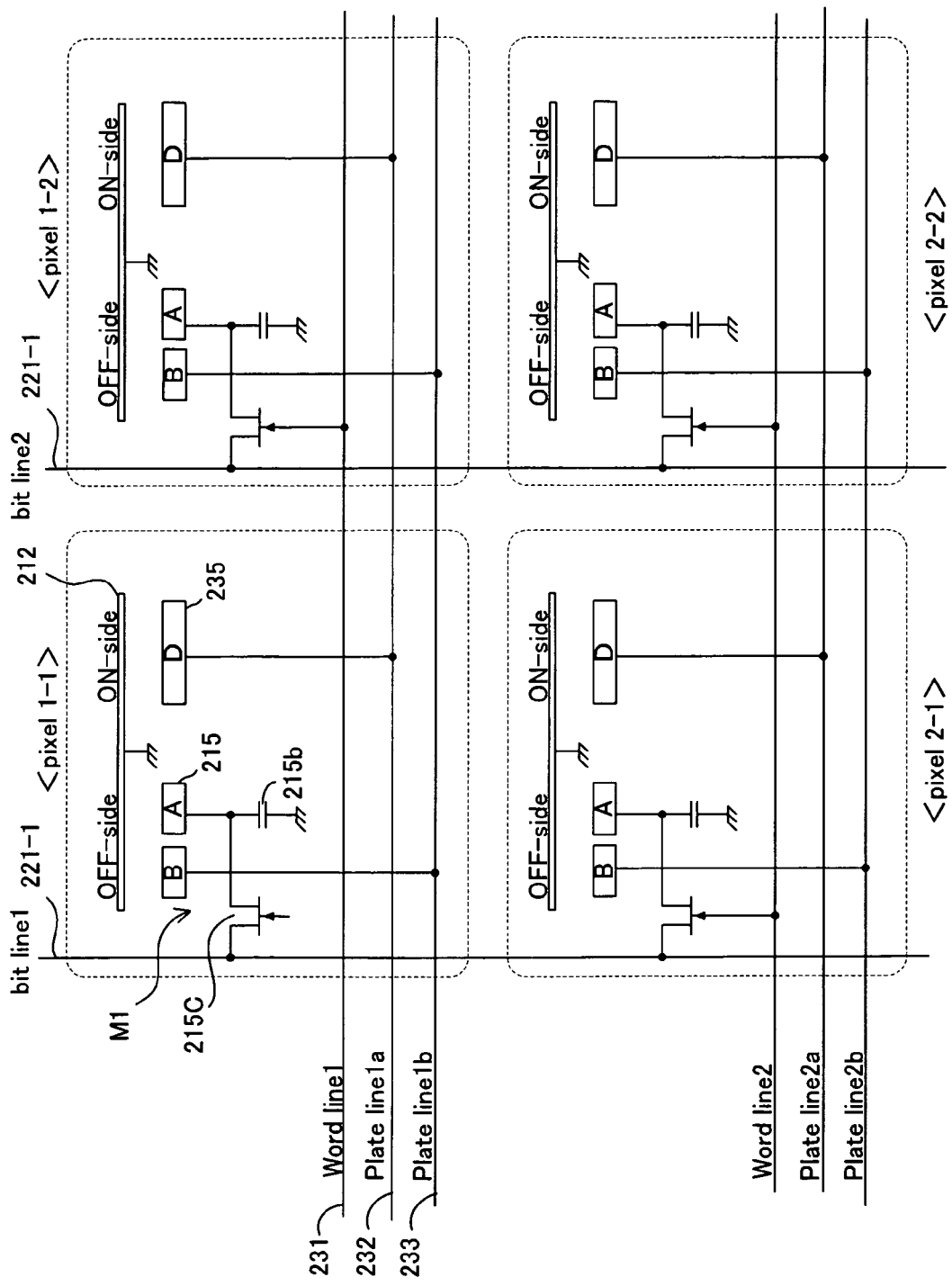
FIG. 6 is a functional circuit diagram showing an exemplary modification of the circuit configuration exemplified in FIG. 4.

FIG. 6 is a functional circuit diagram showing an exemplary modification of the circuit configuration exemplified in FIG. 5.

The example shown in FIG. 6 is configured to add, to the configuration shown in FIG. 5, a second OFF electrode 236 (i.e., an electrode B) and a second plate line 233.

FIG. 7 is a table showing exemplary specifications of the structure of a spatial light modulator constituting a display system, according to a preferred embodiment of the present invention.

Various combinations of pixel pitch, transistor, and capacitor, which are included in one pixel, are shown in FIG. 7. The withstand voltage of a transistor is in proportion to the size, whereas for capacitors with the same plate area size, a polycapacitor constituted by poly-silicon plates has a larger capacitance than an aluminum capacitor constituted by aluminum plates.

Referring to FIG. 7, the combination number G1 exemplifies the comprisal of two transistors and two aluminum capacitors. In this combination, if the ON/OFF regions of the mirror 212, in which the pixel pitch is 8 μm, are respectively equipped with one piece of DRAM memory, two transistors with a withstand voltage of 12 volts actually occupy the MOS substrate in the pixel region. Therefore, the OFF capacitor 215*b* and ON capacitor 216*b* of the memory cell M1 and memory cell M2 are configured so as to place an aluminum capacitor comprising two aluminum plates, between the transistors (i.e., the gate transistor 215*c* and gate transistor 216*c*) and MEMS unit (i.e., the mirror 212, hinge 213, the OFF electrode 215 and ON electrode 216).

The combination number G2 shown in FIG. 7 is a configuration constituted by one transistor and one poly-silicon capacitor. In this case, the configuration is such that only the OFF region of the mirror (with 8 μm pixel pitch) is equipped with one piece of DRAM memory and such that one transistor possessing a 12-volt withstand voltage and one poly-capacitor are placed on the substrate in the pixel region. This circuit configuration has been described for FIG. 5. The configuration of G2 has uses fewer masks in the photolithography process and half the number of transistors, as compared to the configuration of G1, thus improving the production yield.

The configurations of the other combination numbers G3 and G4 shown in FIG. 7 are those obtained by down-sizing the respective configurations of the combination numbers G1 and G2.

In these cases, the configurations of the spatial light modulator 200 of the combination numbers G1 and G3 (which are collectively defined as group 1) comprise two pieces of DRAM, exemplified in FIGS. 3 and 4.

Meanwhile, the configurations of the spatial light modulator 200 of the combination numbers G2 and G4 (collectively defined as group 2) comprise one piece of DRAM, exemplified in FIGS. 5 and 6.

The spatial light modulator 200, configured as group 1 described above, can be used as the display element by inverting the display of a video image 180 degrees (i.e. top and bottom and right and left reversed) about the center of the image even if the incident direction of the incident light 511 is reversed. The configuration of group 1 also enables a high level gray scale algorithm using the second ON electrode 235 (i.e., the electrode D).

Using the spatial light modulator 200 configured as group 2, the incidence direction of the incident light 511 is fixed. In the case of a circuit configuration (refer to FIG. 6) with which a high grade gray scale algorithm is compatible, there are many wirings along the ROW direction (i.e., three wirings, that is, the word line 231, plate line 232 and second plate line 233), possibly impeding an increase in drive speed in the ROW direction due to a stray capacitance.

However, the configuration of group 2 makes it possible to use a single large transistor (i.e., the gate transistor 215*c*), specifically, a transistor with a high withstand voltage, enabling the tilting control by increasing the voltage applied to the OFF electrode 215, for a hinge 213 with a higher rigidity as a countermeasure to stiction. This configuration further reduces by half the number of transistor to be used, thus improving the yield in the production process of the spatial light modulator 200.

Comparing the aluminum capacitor (i.e., metal-insulator-metal (MIM capacitor)) to the poly-capacitor, the former is formed using the metal layer on the upper side of the silicon substrate, and the size of the transistor of, thereby making it possible to increase the size of the transistor. The latter is formed on the surface of the silicon substrate and has an advantage of increasing the capacitance per unit size, as compared to the MIM capacitor.

Alternatively, a transistor may be placed, instead of a poly-capacitor, to form a capacitance using the wiring.

The above described circuit configuration, according to the present embodiment, is configured with the optimal combination number, in accordance with requirements such as light level gray scale, countermeasure to stiction and production yield, thereby enabling the configuration of a compact, high performance projection apparatus 100 (i.e., a display device).

The following is an example of the relationship between the withstand voltage and size of a transistor.

To obtain a 12-volt withstand voltage, a possible size is an active area width W of 4 μm and an active area length L of 7.5 μm.

To obtain a 6-volt withstand voltage, a possible size is an active area width W of 3 μm and an active area length L of 5.5 μm.

Next is a description of an example of the implementation of the above described circuit configuration of the individual group in a device.

The following describes the circuit configuration shown in FIG. 4, comprising DRAM-structured memory cells M1 and M2, two address electrodes, i.e., the OFF electrode 215 and ON electrode 216, and the second ON electrode 235 as an address electrode comprising no memory cell.

In this case, the memory cells M1 and M2 uses the MIM capacitors as the OFF capacitor 215b and ON capacitor 216b. This configuration corresponds to the arrangement of the groups G1 and G3, which are shown in FIG. 7.

More specifically, the plates used for an MIM capacitor may be made of a metal such as aluminum. This configuration is, however, arbitrary.

FIGS. 8A through 8E show a circuit layout exemplified in FIG. 4, in horizontal cross-sections at different heights (or different depths from the surface) of a pixel unit 211 of the spatial light modulator 200, configured with the OFF electrode 215 (as one memory cell M1 and address electrode), the ON electrode 216 (as one memory cell M2 and address electrode), the second ON electrode 235 (as an address electrode having no memory cell) and a capacitor comprising aluminum plates as the OFF capacitor 215b and ON capacitor 216b. This is an exemplary circuit layout corresponding to the combination numbers G1 and G3 in FIG. 7.

Figure 8A:
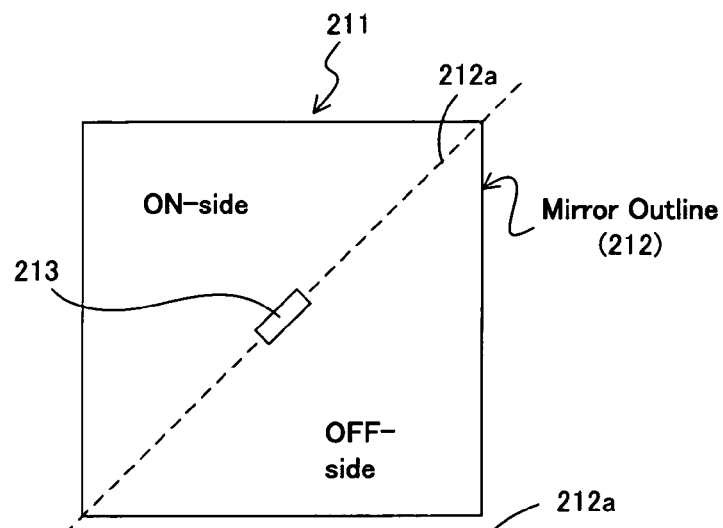
FIG. 8A is a top view diagram showing a circuit layout of a horizontal cross-section of a pixel unit at a specific depth from the surface, according to a preferred embodiment of the present invention.

Specifically, FIG. 8A shows the horizontal cross-section of the hinge 213, in which the hinge 213 is placed such that the length of the rectangular hinge 213 matches the direction of the deflection axis 212a.

Furthermore, the mirror 212 supported by the hinge 213 tilts (i.e., deflects) in the direction of ON-side and OFF-side, divided along the diagonal line of the mirror 212, thereby modulating the incident light 511.

Figure 8B:
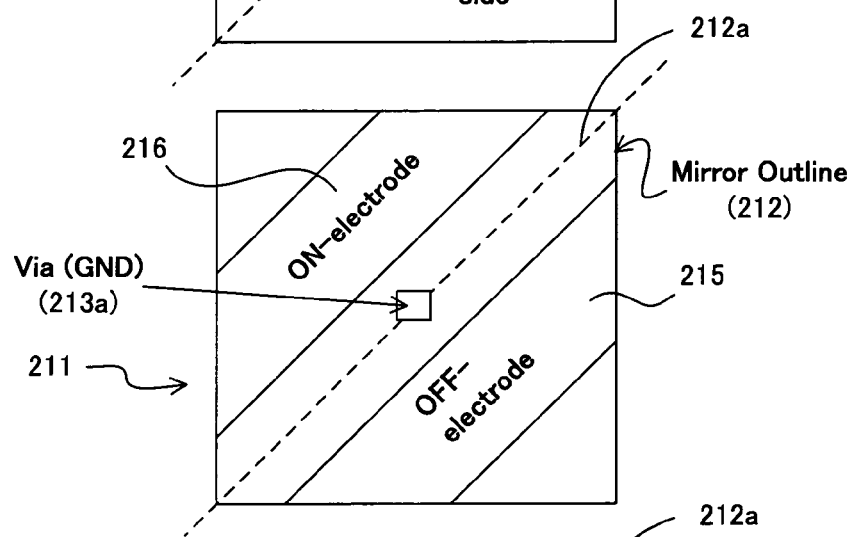
FIG. 8B is a top view diagram showing a circuit layout of a horizontal cross-section of a pixel unit at a different depth from the surface, according to a preferred embodiment of the present invention.

FIG. 8B exemplifies a horizontal cross-section of the circuit layout with the OFF electrode 215 and ON electrode 216, in which the cross-section is lower than that of FIG. 8A.

The hinge electrode 213a connected to the hinge 213 is positioned immediately beneath the hinge 213. Further, conductor patterns constitute the OFF electrode 215 and ON electrode 216, are symmetrically placed about the hinge electrode 213a (which is also the deflection axis 212a).

Figure 8C:
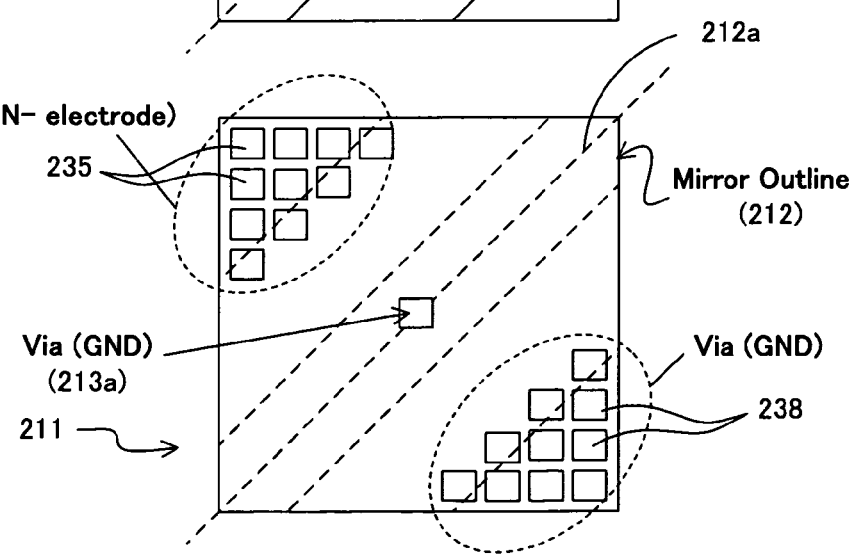
FIG. 8C is a top view diagram showing a circuit layout of a horizontal cross-section of a pixel unit at a different depth from the surface, according to a preferred embodiment of the present invention.

FIG. 8C exemplifies a horizontal cross-section of the circuit layout with the second ON electrode 235, in which the cross-section is lower than that of FIG. 8B.

The second ON electrode 235 and ground Via hole filler conductors 238 are respectively placed in the two diagonal corners, which are not on the deflection axis 212a, and outside of the ON electrode 216 and OFF electrode 215.

More specifically, the ground Via hole filler conductors 238 is symmetrically placed with the second ON electrode 235 to maintain balance with the Via hole of the second ON electrode 235, so that when depositing a thin film in the production process, the device remains as flat as possible.

As exemplified in FIGS. 8B and 8C, the second ON electrode 235 is placed in a different layer (i.e., the wiring layer) from the ON electrode 216, and the two electrodes overlap with one another.

If the second ON electrode 235 and ON electrode 216 are placed in the same layer, the gap between the electrodes needs to be wide, and therefore the area of the electrodes will be reduced. Placing the electrodes in different layers, as in the present embodiment, makes it possible to increase the respective area sizes of these electrodes.

Furthermore, by overlapping the second ON electrode 235 and ON electrode 216, it is possible to secure the necessary area sizes of the second ON electrode 235 and ON electrode 216, even if a positional shift(s) occurs during the production process.

Furthermore, when the mirror 212 tilts, it abuts on the ON electrode 216, not on the second ON electrode 235. This is why a stopper is preferably equipped inside the mirror contour, and because of this, the height of the second ON electrode 235 is preferably lower than that of the ON electrode 216. A higher ON electrode 216 increases the Coulomb force generated, decreasing the voltage to be applied to the ON electrode 216.

Meanwhile, the second ON electrode 235 is formed by a plurality of Via hole filler conductors. The plate line 232, to which the Via hole filler conductors are connected, is in a lower layer than the Via hole filler conductors.

The placement of the second ON electrode 235, as the Via hole filler conductors, shortens the distance between the electrode 235 and mirror 212, thereby improving the controllability, as compared to a case in which the plate line 232 is simply enlarged to make it the electrode for controlling the mirror 212.

Figure 8D:
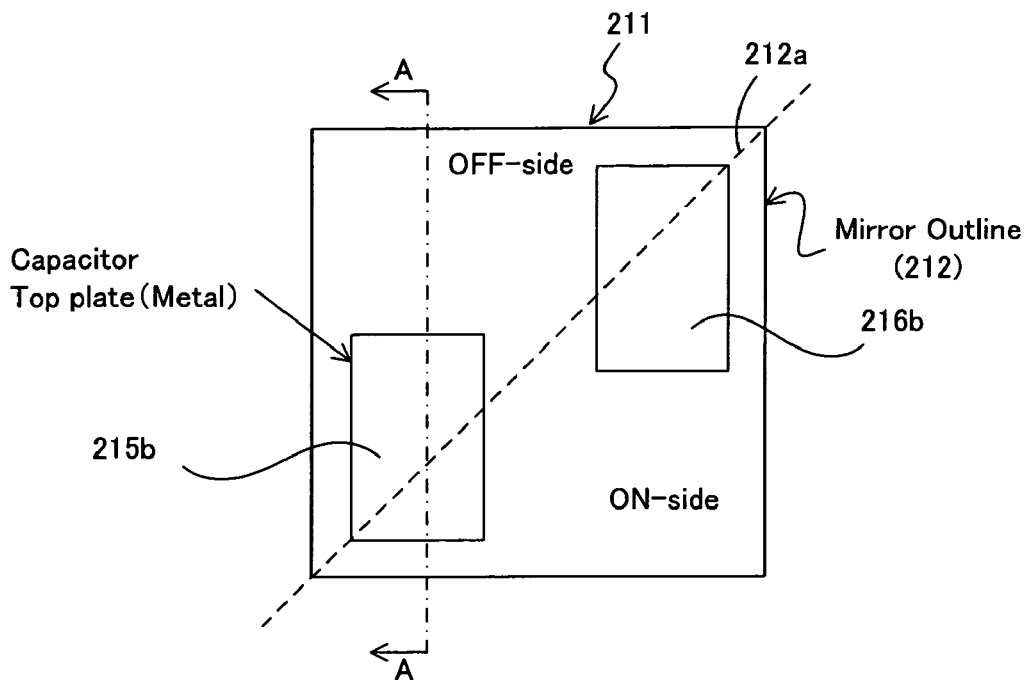
FIG. 8D is a top view diagram showing a circuit layout of a horizontal cross-section of a pixel unit at a different depth from the surface, according to a preferred embodiment of the present invention.

FIG. 8D shows the horizontal cross-section of the layer in which the upper capacitor plate of the ON capacitor 216b and the gate transistor 215c are placed.

The present embodiment is configured to place the OFF capacitor 215b and ON capacitor 216b straddling the deflection axis 212a of the pixel unit 211 in the diagonal direction.

Figure 8E:
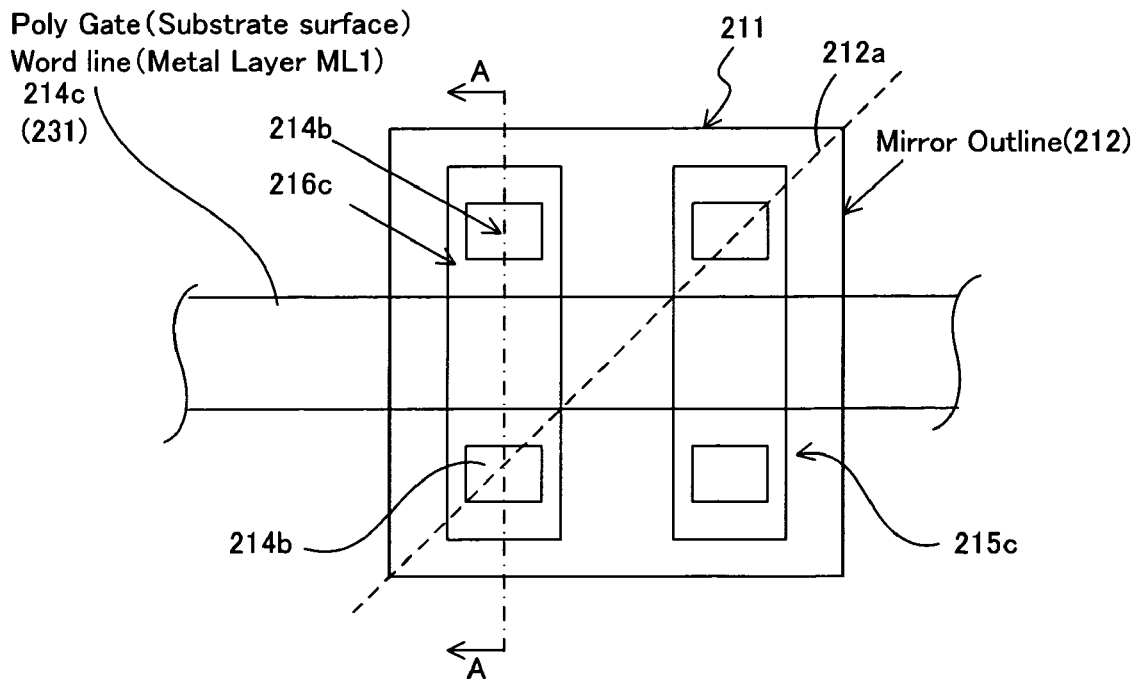
FIG. 8E is a top view diagram showing a circuit layout of a horizontal cross-section of a pixel unit at a different depth from the surface, according to a preferred embodiment of the present invention.

FIG. 8E shows the horizontal cross-section of the layer in which the gate transistor 215c and gate transistor 216c are placed, lower than that shown in FIG. 8D. The gate transistor 215c and gate transistor 216c are placed in parallel to each other with the, word line 231 at the center.

As exemplified in FIGS. 8D and 8E, the gate transistor 215c and OFF capacitor 215b are placed straddling the deflection axis 212a of the mirror 212, as are the gate transistor 216c and ON capacitor 216b.

The source (i.e., the N-well 214b) of the gate transistor 215c (or gate transistor 216c) and the upper capacitor plate 216b-2 of the OFF capacitor 215b (or ON capacitor 216b) become a potential for controlling the mirror 212, and therefore a transistor and a capacitor are preferably placed, as close as possible, on the side corresponding to the tilting direction of the mirror 212.

However, they are actually placed straddling the deflection axis 212a due to the limitations of the pixel size and the size and form of each circuit element. In this case, in order not to affect the mirror 212 on the other side, a metal layer is inserted between the capacitor and ON electrode 216 (or OFF electrode 215) (N.B., the shield layer 232a of a fourth layer metal wiring layer ML4 (shown in FIG. 9) is applicable to this layer).

Furthermore, the present embodiment is also configured to wire a poly-silicon gate electrode 214c and word line 231 parallel to and overlapped with each other, as exemplified in FIG. 8E.

As such, the present embodiment is configured to wire the word line 231 parallel to and overlapped with the poly-silicon gate electrode 214c, in a first layer metal wiring layer ML1, relative to the poly-silicon gate electrode 214c, which is positioned in the ROW direction, in order to reduce the resistance and stray capacitance of the word line 231 and to improve the drive speed of the ROW line.

Figure 9:
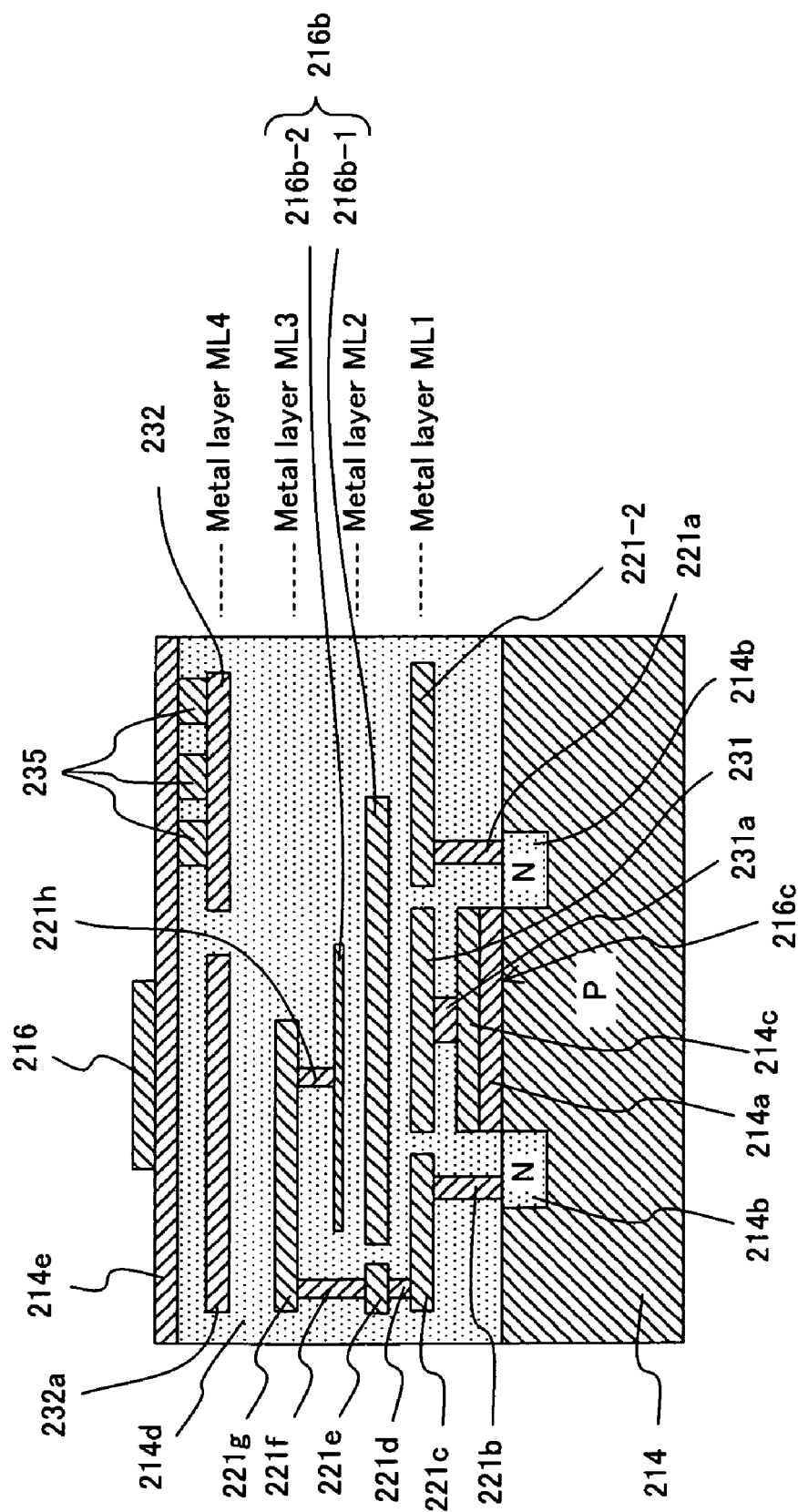
FIG. 9 is a cross-sectional diagram of the part along the line A-A as indicated in FIGS. 8D and 8E.

FIG. 9 is a cross-sectional diagram of the part along the line A-A, as indicated in FIGS. 8D and 8E.

The following describes the process of forming the gate transistor 216C. Introducing an N-type impurity with a field oxidized film (FOX) formed on the principal surface of a substrate 214 made of, for example, a P-type semiconductor used as a mask, forms a pair of N-wells 214b. Then, selectively letting the field oxidized film between the pair of N-wells 214b remain forms a gate oxidized film 214a. Then, the poly-silicon gate electrode 214c is placed on and along the formed gate oxidized film 214a.

The present embodiment is also configured to deposit four metal layers, i.e., the first layer metal wiring layer ML1 through fourth layer metal wiring layer ML4, with insulation layers 214d between the adjacent layers, thereby forming various wirings (which are described later).

More specifically, the insulation layers 214d are actually sequentially deposited between the adjacent wiring layers; the borders on which the insulation layer 214d is deposited is not provided in the figure for the sake of simplicity.

In this case, the word line 231, of approximately the same width as the poly-silicon gate electrode 214c, is positioned by using the first layer metal wiring layer ML1 right above the poly-silicon gate electrode 214c, with the word line 231 connected to the poly-silicon gate electrode 214c through a contact hole filler conductor 231a.

A bit line 221-2 and a conductor pattern 221c are formed in the first layer metal wiring layer ML1 that is at the same height as the word line 231.

The bit line 221-2 is connected to one N-well 214b of the gate transistor 216c by way of a contact hole filler conductor 221a.

The other N-well 214b of the gate transistor 216c is connected to the upper capacitor plate 216b-2 of the ON capacitor 216b by way of the contact hole filler conductor 221b, conductor pattern 221c, Via hole filler conductor 221d, conductor pattern 221e, Via hole filler conductor 221f, conductor pattern 221g (i.e., the third layer metal wiring layer ML3).

A lower capacitor plate 216b-1, formed as the second layer metal wiring layer ML2 simultaneously with the conductor pattern 221e, is placed opposite to the upper capacitor plate 216b-2, and thus the two plates form the ON capacitor 216b.

With this configuration, charging from the bit line 221-2 to the ON capacitor 216b is controlled by the ON/OFF operation of the gate transistor 216c that is controlled through the word line 231.

Furthermore, the plate line 232 and shield layer 232a are formed on the fourth layer metal wiring layer ML4, and the second ON electrode 235 is formed on the plate line 232 by conductors filled in the Via holes.

The shield layer 232a is equipped for electromagnetically separating the ON electrode 216 from the lower-positioned ON capacitor 216b and gate transistor 216c.

The entire top surface of the second ON electrode 235 is covered with an insulation film 214e functioning as etching stopper, and the ON electrode 216 is placed on the insulation film 214e.

Figure 10:
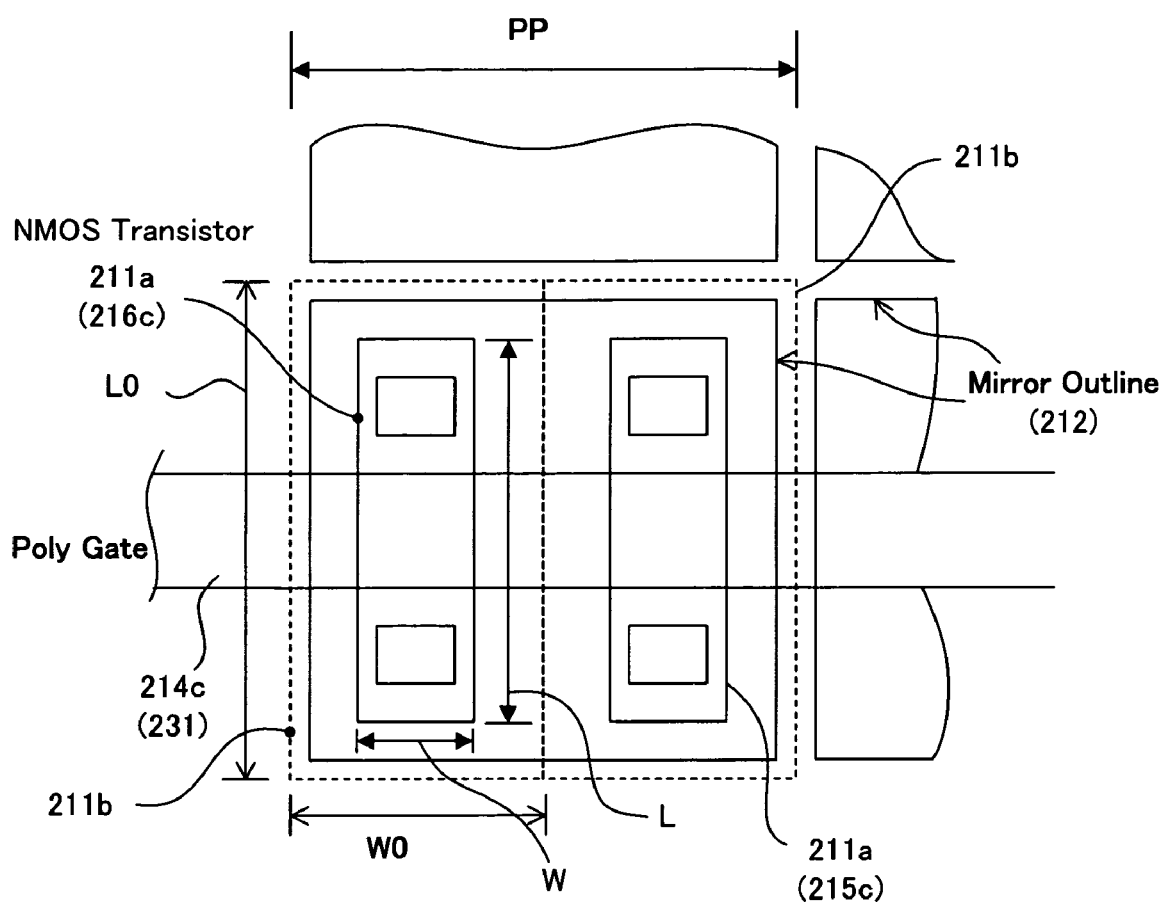
FIG. 10 is a top view diagram exemplifying the relationship between the array pitch of individual pixel units of a pixel array and the sizes of the active area and field area of a transistor.

FIG. 10 is a top view diagram exemplifying the relationship between the array pitch of individual pixel units 211 of a pixel array 210 and the sizes of the active area and field area of a transistor.

As exemplified in FIG. 10, two adjacent field areas 211b, each of which has a field length L0 and field width W0, are arranged inside individual pixel units 211 that are arrayed in the pixel array pitch PP.

In each field area 211b, there is an active area 211a, which has an active area width W and an active area length L and in which the gate transistor 215c or the gate transistor 216c is formed.

The following is an example of the relationship between the active area 211a (i.e., the operation area) and field area (i.e., the area necessary to be placed apart from another element so as to prevent an insulation breakdown of the active area 211a) of a transistor (i.e., the gate transistor 216c or gate transistor 215c) and the pixel array pitch PP.

Specifically, the present embodiment is configured to set the relationship between the pixel array pitch PP and the active area width W and active area length L so that the pixel array pitch PP is no more than 1.5 times the active area length L and so that the pixel array pitch PP is the same as the field length L0, the length of the field area 211b, or 2 times the field width W0.

Therefore, the settings are: the active area width W at 2.3 μm, the active area length L at 6 μm, and the pixel array pitch PP at 9 μm.

Figure 11:
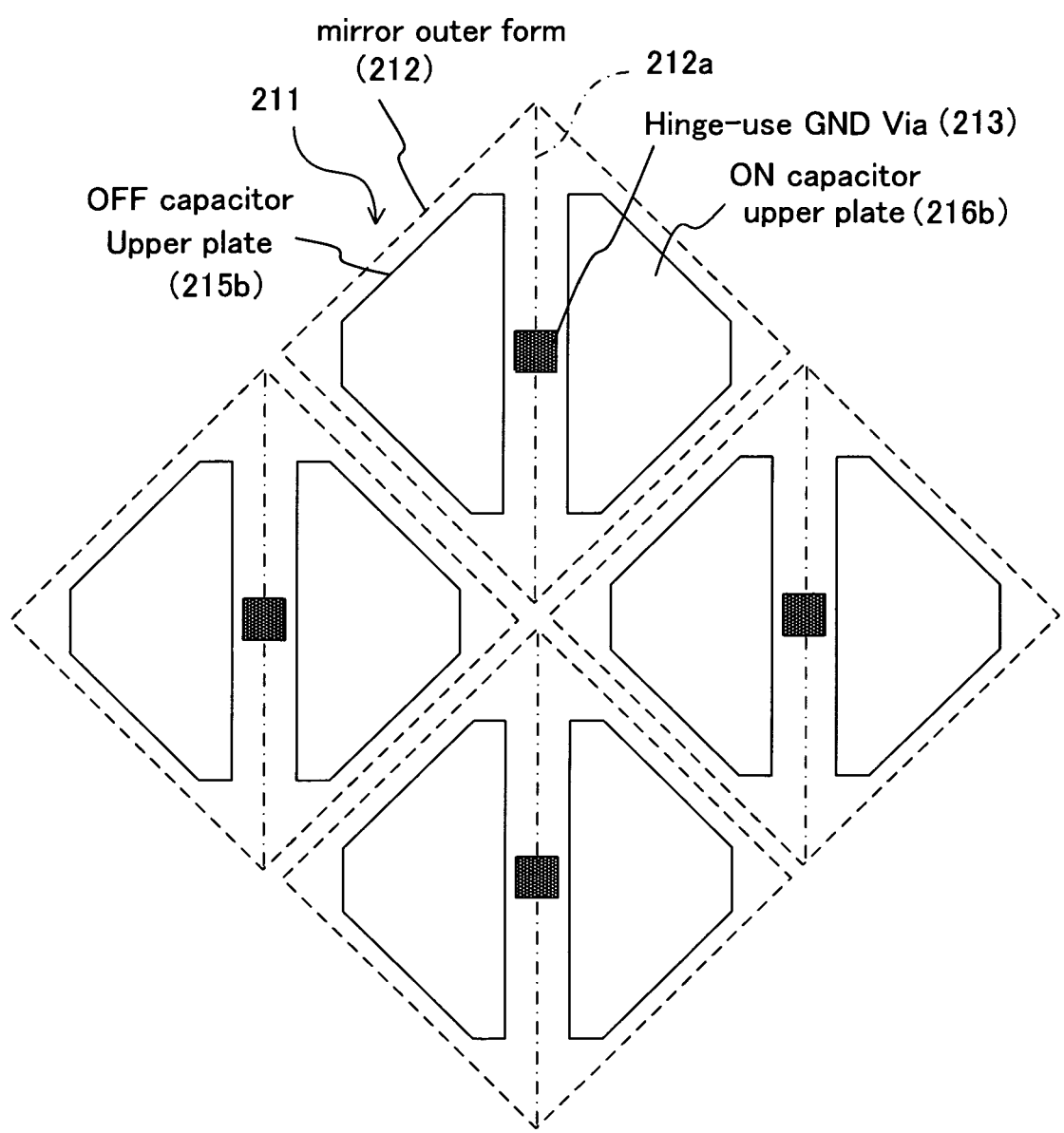
FIG. 11 is a top view diagram describing the layout of a capacitor comprised in an exemplary modification of a pixel unit of a display system according to a preferred embodiment of the present invention.

FIG. 11 is a top view diagram showing an exemplary modification of the layout of the OFF capacitor 215b and ON capacitor 216b comprised in a pixel unit 211, configured as exemplified in FIG. 4. Specifically, FIG. 11 is a view of the layer of the ON capacitor 216b and OFF capacitor 215b from the top surface of the mirror 212. The OFF capacitor 215b and ON capacitor 216b are respectively placed on either side of the deflection axis 212a.

FIGS. 12A, 12B, 12C and 12D are the circuit configuration exemplified in FIG. 6, exemplifying the configuration that comprises an OFF electrode 215 as one memory cell M1 and address electrode and two address electrodes (i.e., a second ON electrode 235 and a second OFF electrode 236) having no memory cell, using a poly-silicon capacitor as an OFF capacitor 215b.

This is an exemplary circuit layout corresponding to the combination numbers G2 and G4 shown in FIG. 7.

More specifically, the configuration of a pair of plates (i.e., conductors) constituting the poly-silicon capacitor is not limited to the combination of a poly-silicon plate and a diffusion layer (i.e., an N-well 214b), which are described later. Alternately it may be a combination of a poly-silicon plate and poly-silicon plate or a poly-silicon plate and a metal plate.

Figure 12A:
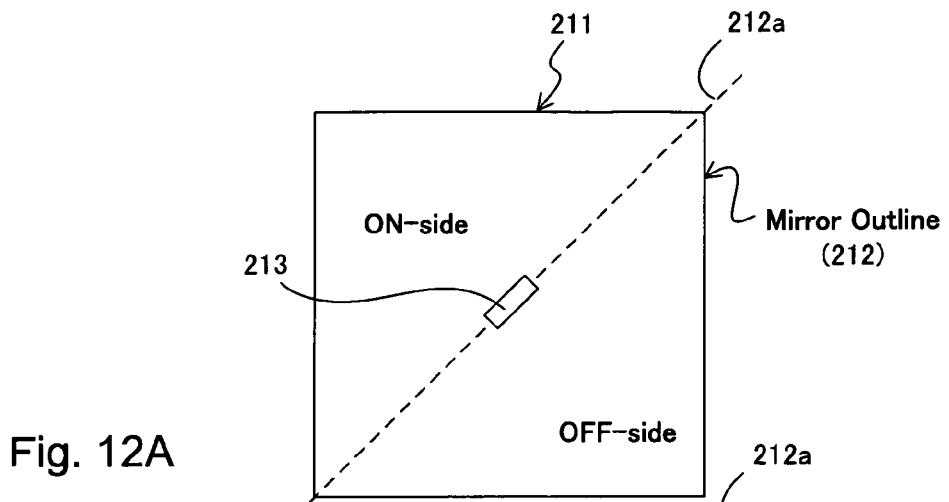
FIG. 12A is a top view diagram showing a circuit layout, of cross-sections in different heights, of each pixel unit of a spatial light modulator according to a preferred embodiment of the present invention.
Figure 12B:
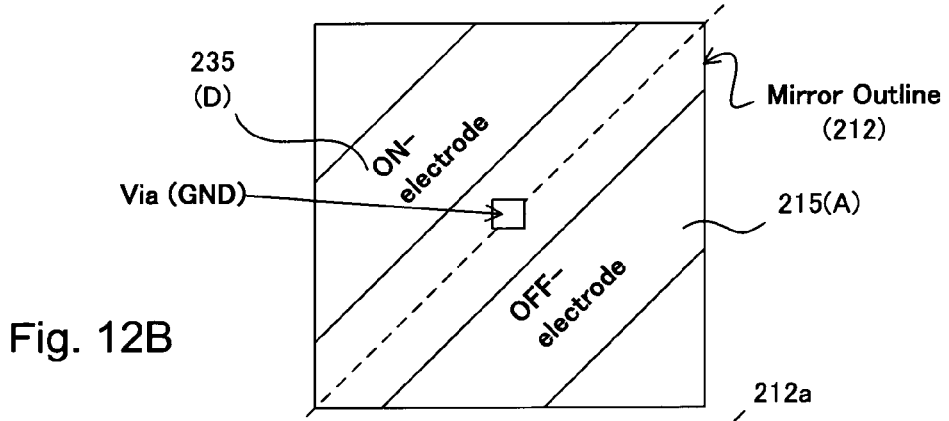
FIG. 12B is a top view diagram showing a circuit layout, of cross-sections in different heights, of each pixel unit of a spatial light modulator according to a preferred embodiment of the present invention.

FIGS. 12A and 12B are similar to the layout shown in FIGS. 8A and 8B.

Figure 12C:
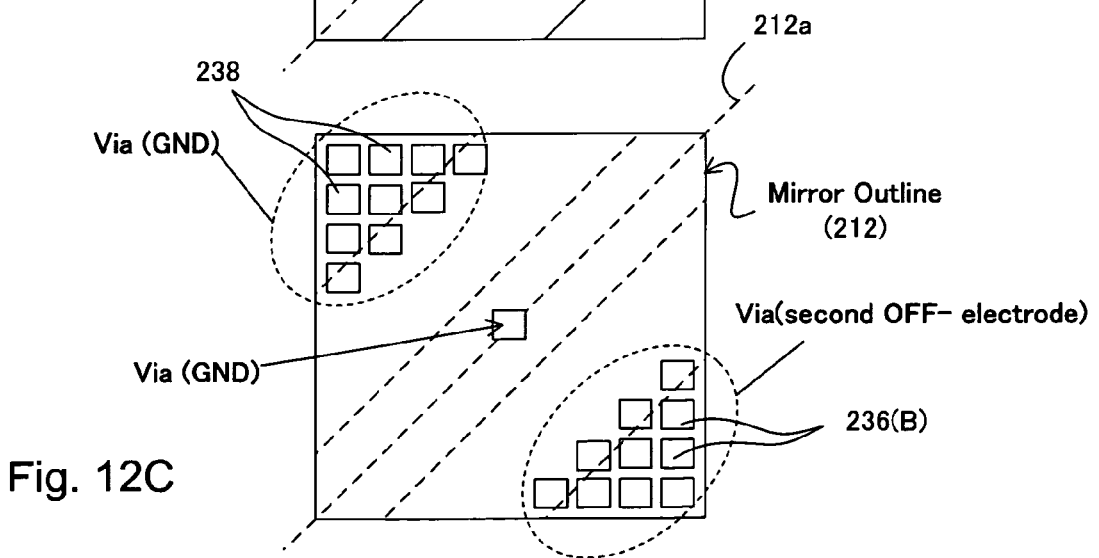
FIG. 12C is a top view diagram showing a circuit layout, of cross-sections in different heights, of each pixel unit of a spatial light modulator according to a preferred embodiment of the present invention.

In FIG. 12C, the second OFF electrode 236 is placed in a corner of the pixel unit 211 so as to be positioned on the outside of the OFF electrode 215 and so as to balance the ground Via hole filler conductors 238, in the diagonal corner on the outside of the second ON electrode 235.

Figure 12D:
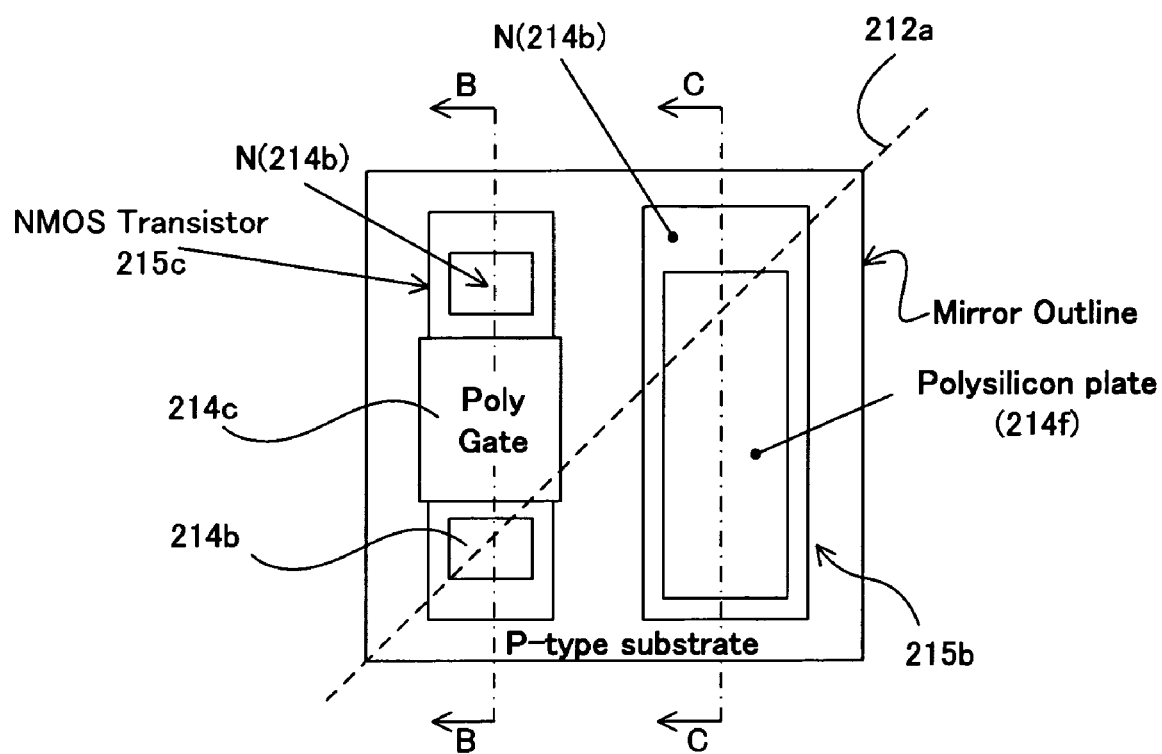
FIG. 12D is a top view diagram showing a circuit layout, of cross-sections in different heights, of each pixel unit of a spatial light modulator according to a preferred embodiment of the present invention.

Furthermore, as exemplified in FIG. 12D, the OFF capacitor 215b utilizing a transistor structure is placed, in place of the gate transistor 216c, next to the gate transistor.

Figure 13A:
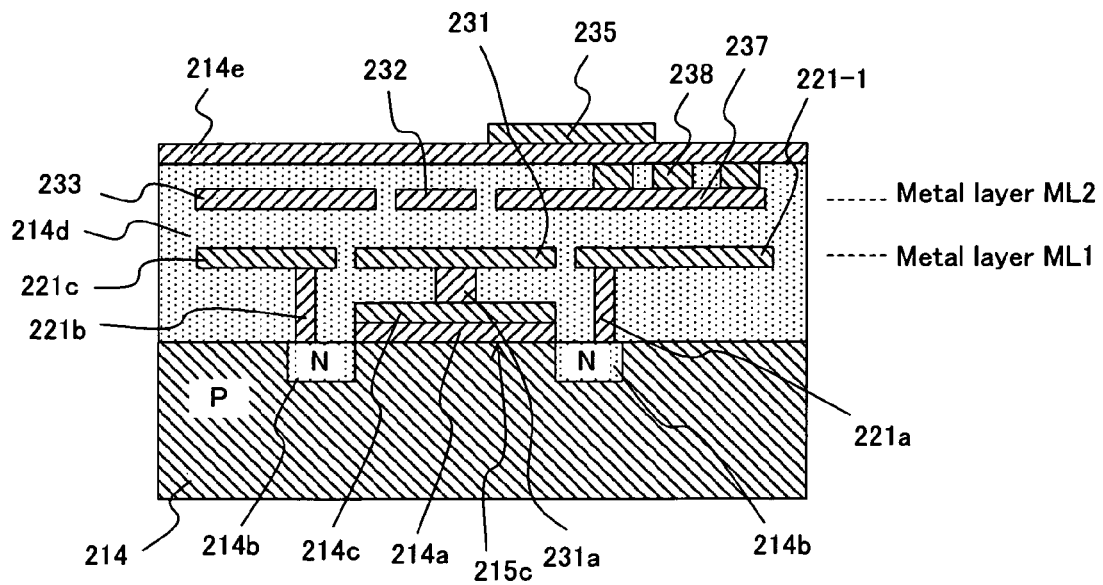
FIG. 13A is a cross-sectional diagram along the line B-B indicated in FIG. 12D.
Figure 13B:
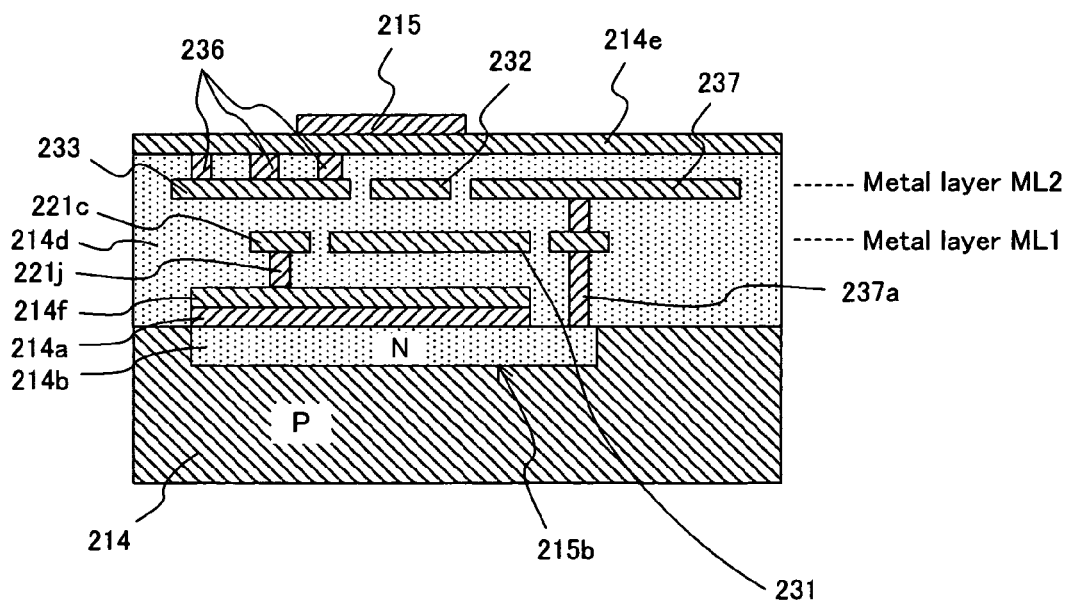
FIG. 13B is a cross-sectional diagram along the line C-C indicated in FIG. 12D.

FIG. 13A is a cross-sectional diagram along the line B-B indicated in FIG. 12D; FIG. 13B is a cross-sectional diagram along the line C-C.

Incidentally in FIGS. 13A and 13B, the same component designations are assigned to common components in FIG. 9, and duplicate descriptions are not provided here.

In this configuration, a bit line 221-1 is formed on the gate transistor 215c using a first layer metal wiring layer ML1, and the plate line 232, second plate line 233 and a ground line 237 are formed on the aforementioned layer using a second layer metal wiring layer ML2.

Furthermore, the second ON electrode 235 is formed on the surface of an insulation film 214e covering the ground Via hole filler conductors 238.

The bit line 221-1 is connected to one N-well 214b of the gate transistor 215c by way of a contact hole filler conductor 221a.

The other N-well 214b of the gate transistor 215c is connected to a contact hole filler conductor 221b and to a conductor pattern 221c. The conductor pattern 221c is connected to a poly-silicon plate electrode 214f that is the upper plate of an OFF capacitor 215b (which is described later).

Meanwhile, as exemplified in FIG. 13B, the OFF capacitor 215b in this case is constituted by a large N-well 214b (i.e., a conductor) formed on the substrate 214, and by a gate oxidized film 214a and a poly-silicon plate electrode 214f, which cover the N-well 214b.

The poly-silicon plate electrode 214f is formed simultaneously with the poly-silicon gate electrode 214c (in FIG. 13A).

The conductor pattern 221c and word line 231 are formed using the second layer metal wiring layer ML1.

The poly-silicon plate electrode 214f, which is the upper plate, is connected to the gate transistor 215c (in FIG. 13A) by way of a contact hole filler conductor 221j, the above described conductor pattern 221c, and such.

Furthermore, the second plate line 233, plate line 232 and ground line 237 are formed on the word line 231, and such, using the second layer metal wiring layer ML2.

Then, a plurality of second OFF electrodes 236 is formed above the second plate line 233 utilizing Via holes.

Furthermore, the OFF electrode 215 is placed on the surface of the insulation film 214e that covers over the second OFF electrode 236.

Figure 14A:
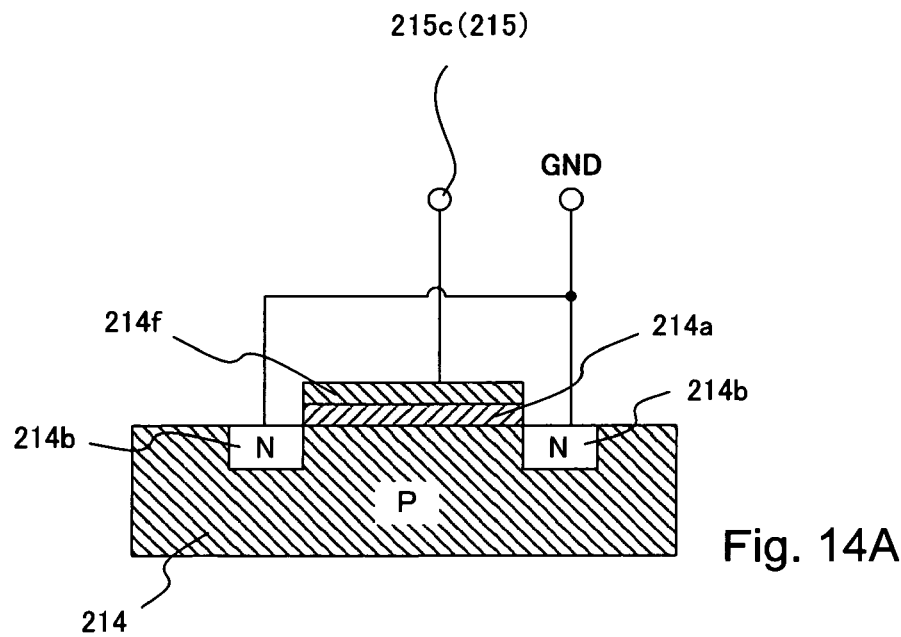
FIG. 14A is a conceptual diagram showing a method for connecting the structure of a transistor not in use as a capacitor (i.e., an OFF capacitor) in each pixel unit of a spatial light modulator according to a preferred embodiment of the present invention.

FIG. 14A exemplifies a method for connecting the structure of the gate transistor 216c, which is not in use, as a capacitor (i.e., the OFF capacitor 215b).

Specifically, the configuration is such that the pair of N-well 214b of a transistor (i.e., the unused gate transistor 216c) is shorted to the ground wire, and the poly-silicon plate electrode 214f is connected to the gate transistor 215c and OFF electrode 215. A specific example is shown in the following description.

Figure 14B:
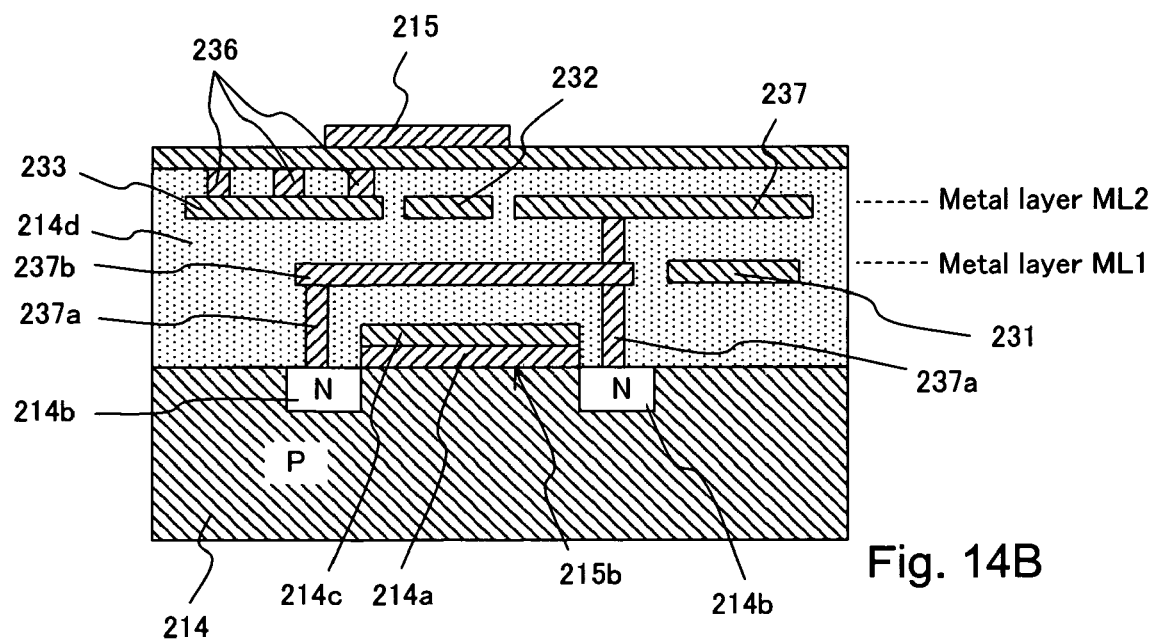
FIG. 14B is a cross-sectional diagram showing the case of substituting a transistor for a poly-silicon capacitor in each pixel unit of a spatial light modulator according to a preferred embodiment of the present invention.

FIG. 14B is a cross-sectional diagram in the case of substituting a transistor for a poly-silicon capacitor in the configuration of FIG. 13B.

Specifically, in the structure of the unused gate transistor 215c that is formed together with the gate transistor 216c in the region of the pixel unit 211, a pair of N-well 214b is connected to the ground line 237 by way of a contact hole filler conductor 237a and the shorting pattern 237b of the first layer metal wiring layer ML1, and thereby the gate transistor 215c is utilized as the OFF capacitor 215b.

The poly-silicon gate electrode 214c of the OFF capacitor 215b is connected to the gate transistor 215c by way of a Via hole, and the like (not shown in drawing), and by way of the conductor pattern 221c exemplified in FIG. 13A.

Figure 15:
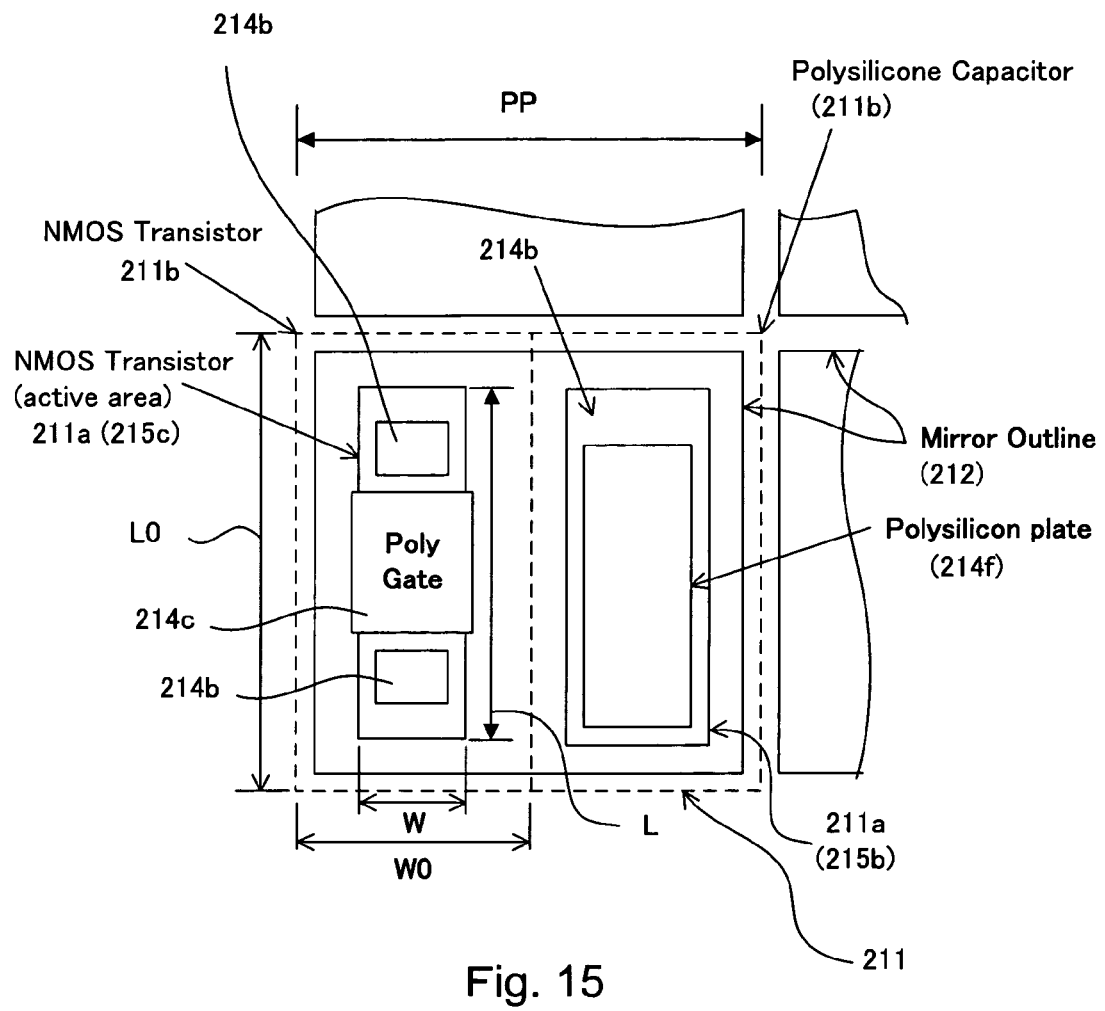
FIG. 15 is a top view diagram exemplifying the relationship between the active area and field area of a transistor and a pixel pitch in each pixel unit of a spatial light modulator according to a preferred embodiment of the present invention.

FIG. 15 is a top view diagram exemplifying the relationship between the active area (i.e., the operating area) and field area (i.e., the area requiring separation from other elements to prevent insulation breakdown) of a transistor and a pixel pitch in the configuration shown in FIG. 12D.

In this case, two field areas 211b, in which the gate transistor 215c and OFF capacitor 215b are respectively formed, are placed adjacent to each other in each pixel unit 211.

In this case, the OFF capacitor 215b comprises a poly-silicon plate electrode 214f. The pixel array pitch PP is set at no larger than 9 μm. The present embodiment is configured to set the pixel array pitch PP of the pixel unit 211 to be equal to the field length L0 or equal to or no larger than 1.5 times the active area length L.

For example, this accordingly sets the active area length L of the gate transistor 215c at 6 μm.

Figure 16A:
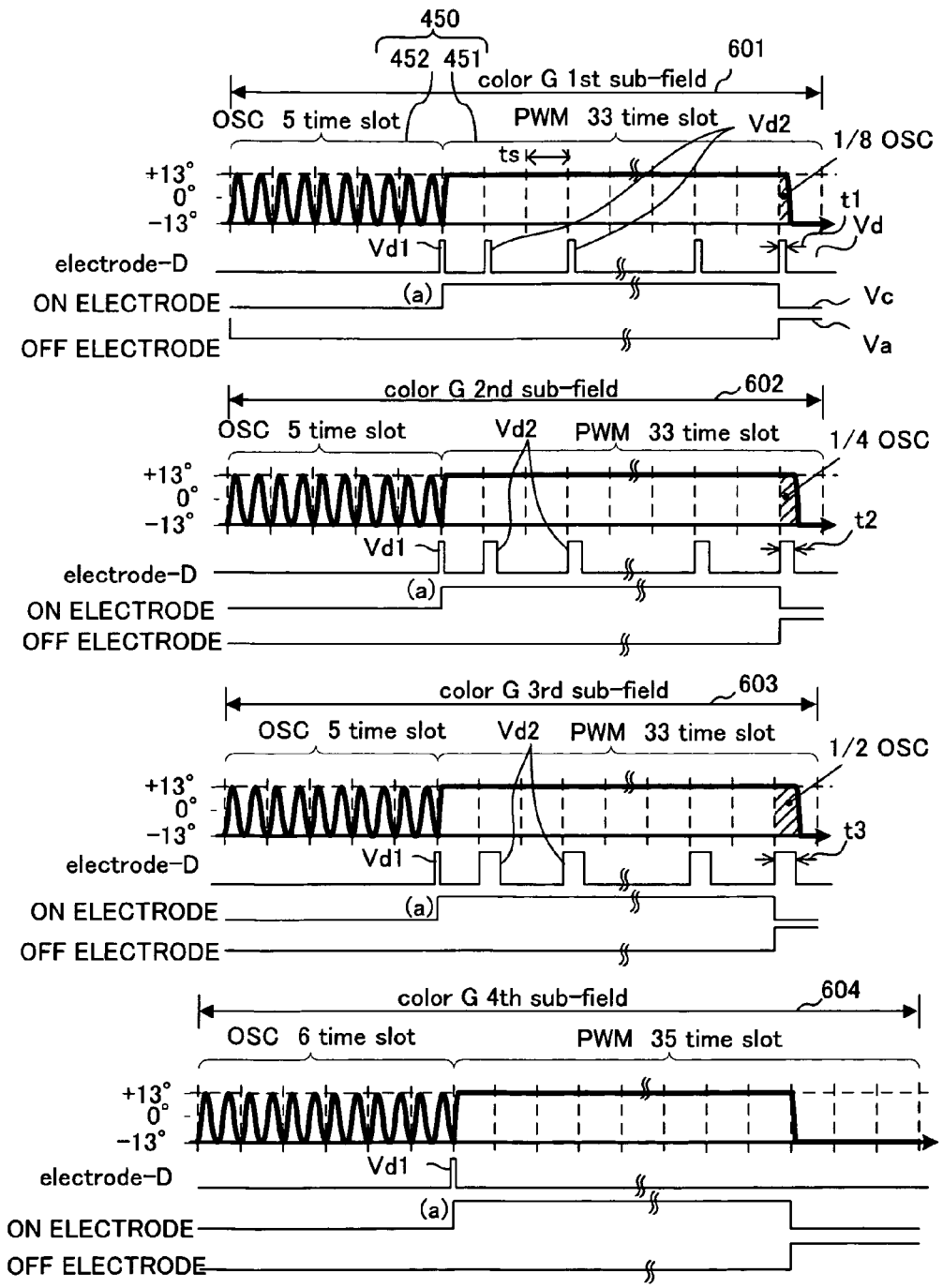
FIG. 16A is a timing diagram showing an exemplary action of a spatial light modulator according to a preferred embodiment of the present invention.
Figure 16B:
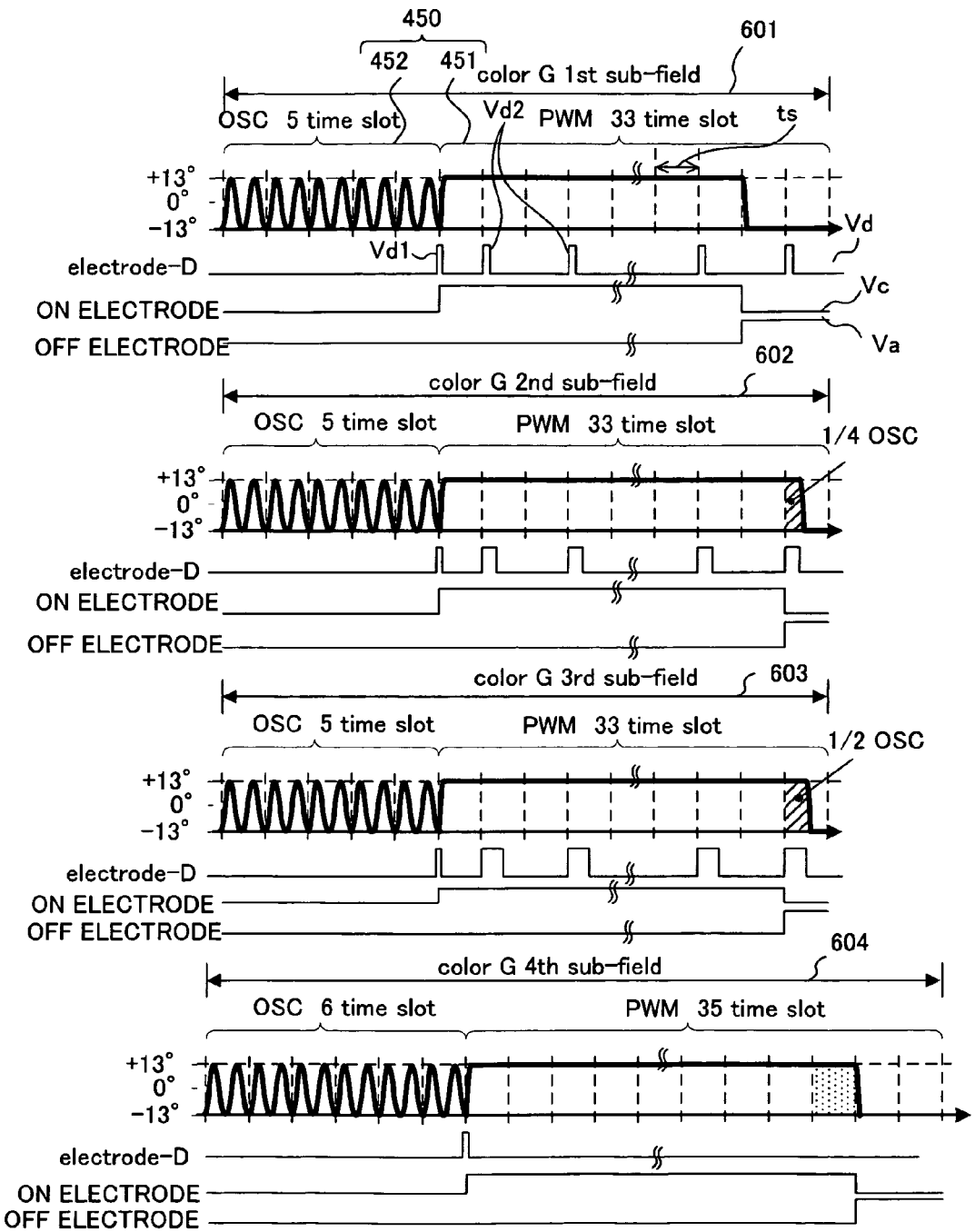
FIG. 16B is a timing diagram showing an exemplary action of a spatial light modulator according to a preferred embodiment of the present invention.

FIGS. 16A and 16B are timing diagrams showing exemplary actions of the spatial light modulator 200 of a projection apparatus 100, according to the present embodiment, exemplified in FIG. 4.

When performing a gray scale display by means of a PWM+OSC on the basis of a mirror control profile 450 that consists of an ON/OFF control pattern 451 (PWM) and oscillation control pattern 452 (OSC), the gray scale is determined by the cycle (i.e., a time slot cycle) of writing to the memory cells M1 and M2.

The present embodiment is accordingly configured to maintain the state of the mirror 212 and maintain it for a period shorter than the time slot ts, using the second ON electrode 235 (i.e., the electrode D) connected to the plate line 232 in the configuration of FIG. 4, even when the data in the memory cells M1 and M2 are changed, thereby enabling control of the intensity of light during a period that is shorter than the time slot ts.

The following is a description of a method for increasing a gray scale level when using a mirror control profile 450 for the control, which is a combination between OSC and PWM consisting of the oscillation control pattern 452 and ON/OFF control pattern 451, in the case of the present embodiment.

FIG. 16A exemplifies the case of structuring one frame (i.e., one screen) of each color with a plurality of subfield: the first subfield 601, second subfield 602, third subfield 603 and fourth subfield 604.

In the pixel unit 211, the ON state of the mirror 212 can be maintained for a predetermined period of time even when the OFF electrode 215 and ON electrode 216, which are connected to the memory cells M1 and M2, respectively, are shifted from (0, 1) to (1, 0), if a pulse Vd2 is given to the second ON electrode 235 (i.e., an electrode D, the plate line 232) that is placed on the ON side (refer to the circuit configuration shown in FIG. 8).

The intensity of light during the aforementioned period through the application of the pulse Vd2 is controlled to be lower than the intensity of light of the oscillation control pattern 452 (OSC) in one time-slot ts and is also controlled to differ in each subfield (i.e., the first subfield 601, second subfield 602, third subfield 603), and thereby projecting images with an increased gradations of gray scale levels.

That is, the width of the pulse Vd2 changes with each of the first subfield 601 through the third subfield 603 as follows:

pulse width t1<pulse width t2<pulse width t3

The pulse width t1 of the pulse Vd2 in the first subfield 601 is set at a value that is ⅛ the intensity of light (noted as "⅛ OSC" hereinafter) in one time-slot of the oscillation control pattern 452; the pulse width t2 of the second subfield 602 is set at ¼ OSC; the pulse width t3 of the third subfield is set at ½ OSC.

The interval of the pulse Vd2 is set so that the electrode D maintaining the state of the mirror 212 is carried out for every other time slot ts. In order to correct the gray scale for one subfield (i.e., the last subfield, the fourth subfield 604 in this case), the voltage Vd of the second ON electrode 235 is equipped with only a pulse Vd1, not a pulse Vd2, and the state of the mirror 212 is not maintained by the second ON electrode 235 (i.e., the electrode D). Instead, the number of time slots ts is adjusted as described later. In adjusting the number of time slots ts, the control process may prevent all the time slots from turning to the ON state in the fourth subfield 604 even if a video signal at a saturated level is inputted into the control apparatus 300.

FIG. 16B shows, as an example, the result of reducing the grades of gray scale equivalent to the intensity of light by ⅛ OSC from that of the example shown in FIG. 16A.

When a data loading of the ON/OFF control pattern 451 (PWM) for the first subfield 601 of FIG. 17A is shortened by the equivalent of one time-slot, the intensity of light is reduced by 1+⅛ OSC in the first subfield 601.

Accordingly, if a data loading for PWM for the fourth subfield 604 is extended by the equivalent of one time-slot, a reduction in the intensity of light by ⅛ OSC can be attained for the entirety of one frame.

With this control, a combination of a light intensity control by means of a pulse Vd2 in each of the first subfield 601 through the third subfield 603 makes it possible to attain a gray scale representation eight times (8×) the gray scale control achieved by means of the ON/OFF control pattern 451 or oscillation control pattern 452 in units of time slot ts.

Specifically, the mirror 212 is drawn to the ON side by the electrode D only for the period of the pulse Vd1 by turning on the electrode D at the time when the mirror is switched from the oscillation control pattern 452 (OSC) to the ON/OFF control pattern 451 (PWM) by controlling the voltage Vd of the second ON electrode 235 (i.e., an electrode D) for each of the first subfield 601 through the fourth subfield 604. The switch of operation occurs when the mirror 212 is operated in the oscillating state under the control of the oscillation control pattern 452 and the mirror is switched smoothly to the ON state on the ON/OFF control pattern 451 in a short time.

Application of the pulse Vd1 as described above is advantageous in that it lowers the voltage applied to the OFF electrode 215 and ON electrode 216, which are connected to the memory cells M1 and M2, respectively, and lowers the power consumption and also acts as a countermeasure to stiction.

The pulse Vd1 may also be applied to control a mirror 212 to switch from the horizontal state to an ON state immediately after turning on the power to a display element. For example, if a mirror 212 cannot be shifted from the horizontal state to the ON state even though the mirror 212 is successfully shifted from the OFF state to the ON state by only the ON electrode 216, to which 5 volts as the voltage Vc is applied, 10 volts can be applied as a pulse Vd1 to the electrode D simultaneously with the application of 5 volts (i.e., the voltage Vc) to the ON electrode 216 when the mirror 212 is in the horizontal state, and then the voltage Vd of the electrode D is returned to zero (0) volts after the elapse of time necessary for the mirror 212 to shift to the ON state. This operation eliminates the need to apply an unnecessarily high voltage for shifting the mirror 212 from the OFF state to the ON state and also reduces stiction. In this case, a voltage (i.e., a snap-in voltage or a pull-in voltage) necessary for shifting the mirror 212 from the horizontal state to the ON state is 5 volts plus 10 volts. The voltages at the electrode D and ON electrode 216 can be set independently.

Figure 17:
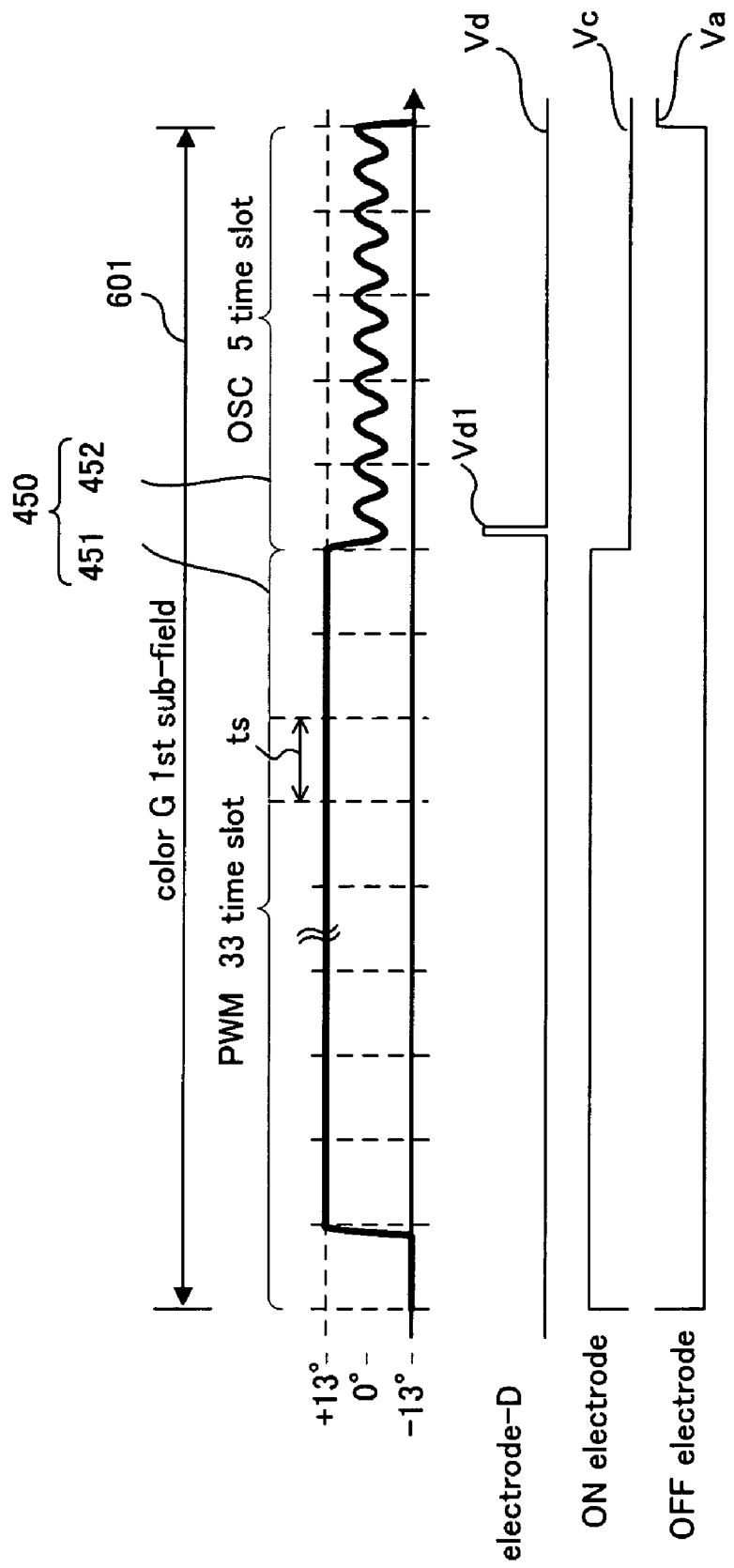
FIG. 17 is a timing diagram showing an exemplary action of a spatial light modulator according to a preferred embodiment of the present invention.

Meanwhile, FIG. 17 illustrates a control process to operate the mirror device in an intermediate oscillation state, when the mirror 212 oscillates between the ON state and OFF state, as a result of a pulse Vd1 applied to the voltage Vd, that is applied to the second ON electrode 235 (i.e., the electrode D) when the mirror control pattern is shifted from the ON/OFF control pattern 451 to the oscillation control pattern 452, when combining the aforementioned two patterns for a spatial light modulator 200, configured as exemplified in FIG. 4.

Figure 18:
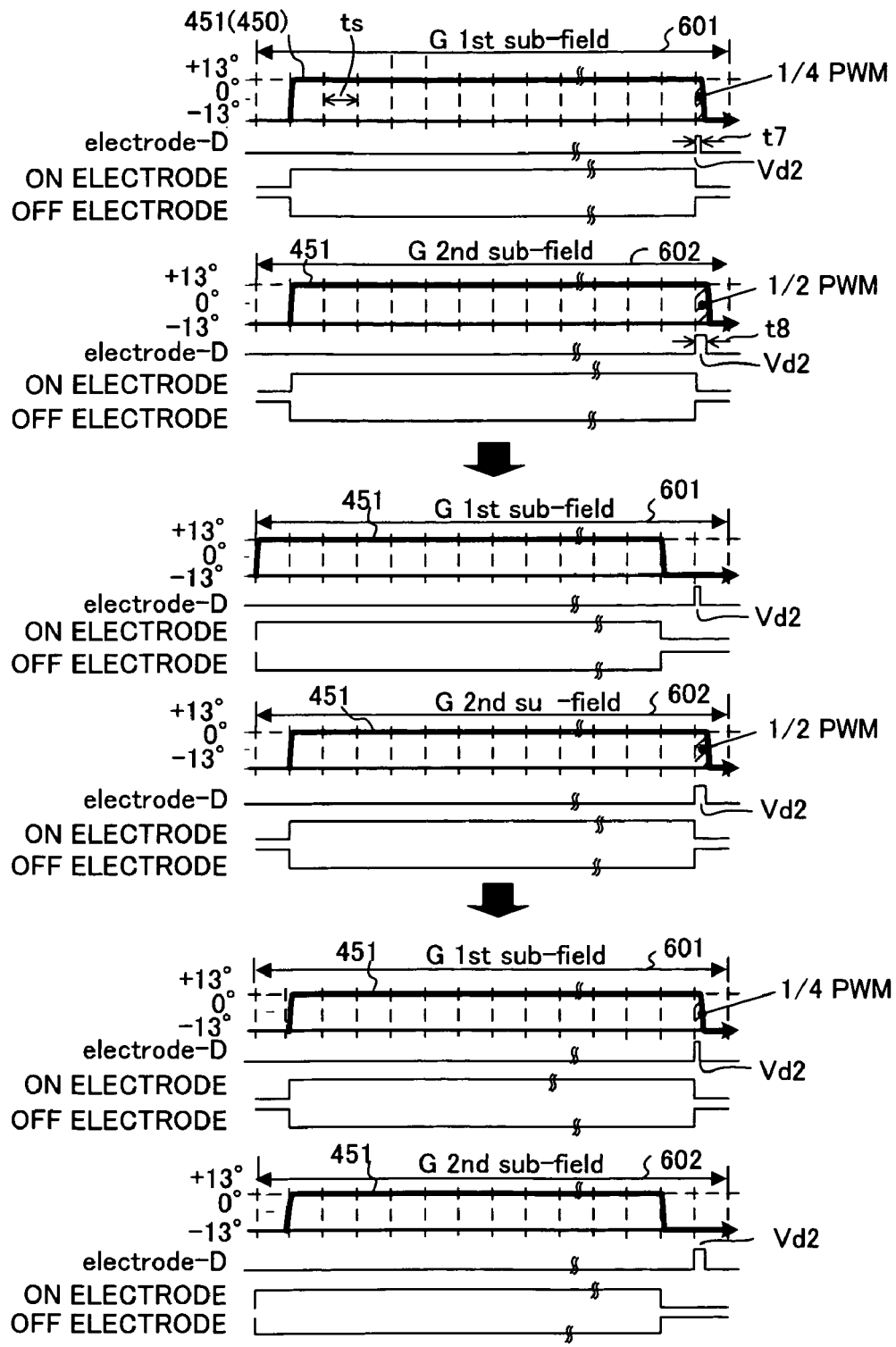
FIG. 18 is a timing diagram showing an exemplary action of a spatial light modulator according to a preferred embodiment of the present invention.

FIG. 18 is a timing diagram showing an exemplary method for improving the number of gray scale levels when using a non-binary PWM for the spatial light modulator 200 configured as exemplified FIG. 4.

In this case, the circuit configuration of a pixel unit 211 uses a configuration that places the second ON electrode 235 (i.e., an electrode D) on the side where the ON electrode 216 (i.e., the electrode C) is placed, as shown in FIG. 4.

Furthermore, one frame is constituted by two subfields, that is, the first subfield 601 and the second subfield 602.

In the case of non-binary PWM, the ON state of the mirror 212 is expressed by a bit string corresponding to the number of gray scale levels, and therefore a gray scale control is performed by setting a continuous ON state during an arbitrary period within a subfield.

In this event, the present embodiment is configured to control, for the pixel unit 211 in which the mirror 212 is in the ON state, the voltage Vd of a plate line 232 so as to maintain the ON state of the mirror 212 only for a predetermined period (i.e., during a pulse Vd2) by means of the electrode D placed on the ON side even when the OFF electrode 215 and ON electrode 216, which are connected to the memory M1 and M2, respectively, are changed from (0, 1) to (1, 0).

The intensity of light during the period of maintaining the pulse Vd2 is set to be lower than the intensity of light under the control of the ON/OFF control pattern 451 (i.e., a PWM control) for the length of one time-slot, and is set to be different for each of a plurality of subfields (in this case, the first subfield 601 and the second subfield 602), and thereby the number of gray scale levels can be increased.

In this case, for the first subfield 601, a pulse width t7 that is equivalent to a ¼ of the intensity of light (noted as "¼ PWM" hereinafter) of the ON state during one time-slot under a PWM control is set as a pulse Vd2 at a position corresponding to the time slot ts at the tail end of the ON/OFF control pattern 451.

Likewise, for the second subfield 602, a pulse width t8 that is equivalent to ½ of the intensity of light (noted as "½ PWM" hereinafter) of the ON state during one time-slot under a PWM control is set as a pulse Vd2 at a position corresponding to the time slot ts at the tail end.

As such, the ON state is maintained by means of the pulse Vd2 of the electrode D at the last time slot of each subfield. If the ON state is not maintained during this period, the PWM waveform of the ON/OFF control pattern 451 is moved to the start of the subfield so as to not use the last two time slots.

By combining the aforementioned control with the presence/absence of controlling the pulse Vd2 in the first subfield 601 and second subfield 602, an improvement in the gray scale representation four times (in this example), that of a simple gray scale control by means of an ON/OFF control in units of time slots ts is achieved.

As described above, the example shown in FIG. 18 has two subfields, that is, the first subfield 601 and second subfield 602, and operates the electrode D in the last time slot ts so as to enable a gray scale representation of ¼ PWM for the first subfield 601 and ½ PWM for the second subfield 602.

Specifically, the control processes switch the mirror from the ON/OFF control pattern 451 to turn on the time slot ts immediately before the pulse Vd2 in the case of turning on a light intensity control using the pulse Vd2 of the electrode D. The control processes switch the ON/OFF control pattern 451 toward the beginning of the subfield in the case to turn off the light intensity control.

Furthermore, FIG. 18 exemplifies the combination between the first subfield 601 and second subfield 602 when the gray scale representations are changed in increments of the light intensity of ¼ PWM starting from the top left.

Figure 19:
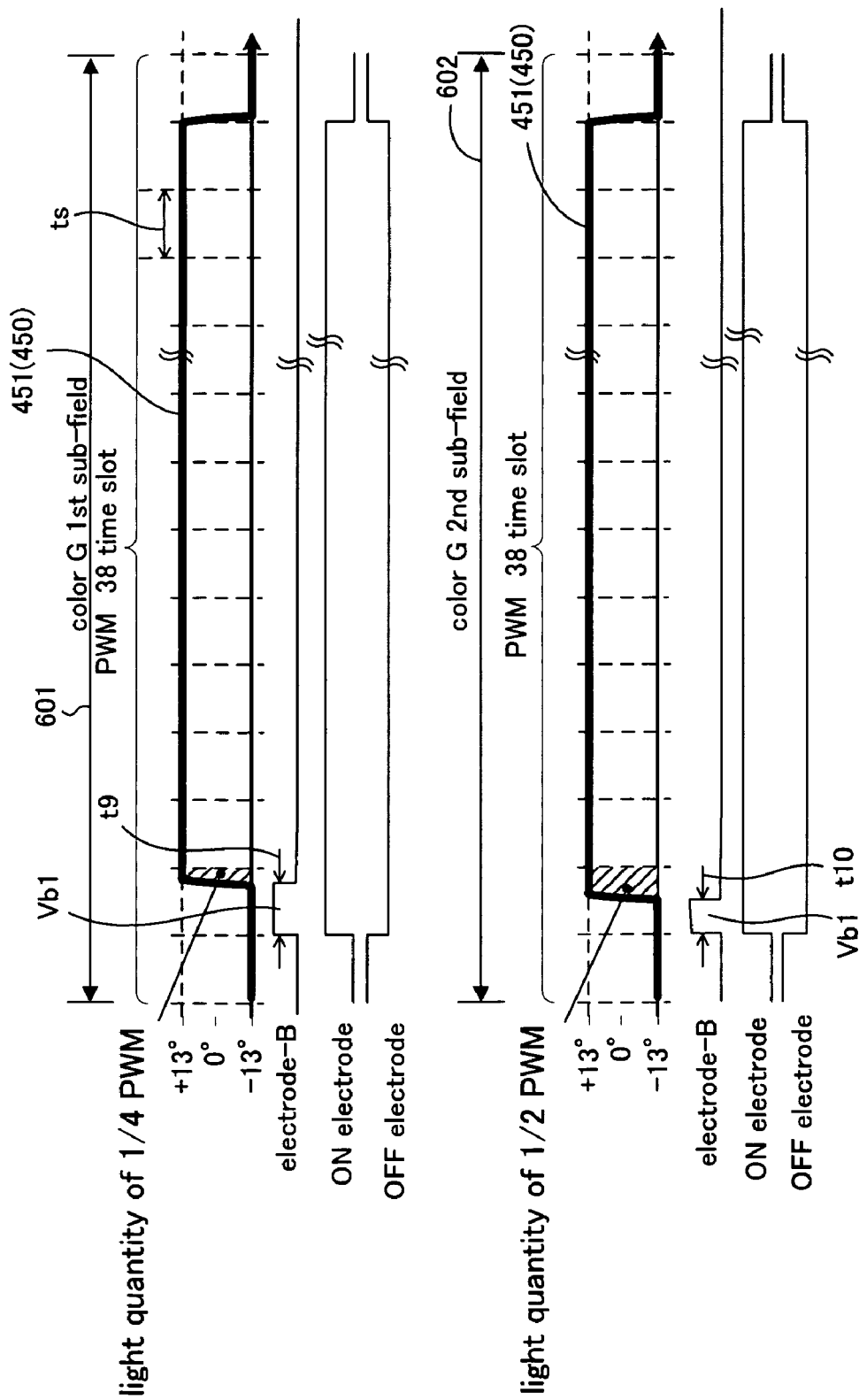
FIG. 19 is a timing diagram showing an exemplary modification of the timing diagram showing in FIG. 18.

FIG. 19 is a timing diagram showing an exemplary modification of the timing diagram shown in the above described FIG. 18. FIG. 19 exemplifies an operation where the operations of the ON electrode and OFF electrode are switched, resulting from inverting the orientation of the incident light 511 in the configuration of a pixel unit 211 exemplified in FIG. 4.

Specifically, the ON electrode 216 and second ON electrode 235 function as OFF-side electrodes, while the OFF electrode 215 functions as ON-side electrode.

Furthermore, the operation of the electrode B is controlled in the first time slot of each subfield so as to maintain the OFF state of the mirror 212 when it starts to shift from the OFF state to ON state.

That is, in the control of the voltage Vb of the electrode B connected to the plate line 232, the pulse Vb1 by pulse widths t9 and t10 are set for the second time slot ts position at the start of the first subfield 601 and second subfield 602, respectively, and the operation of the electrode D is controlled so as to maintain the OFF state of the mirror 212 when it starts to shift from the OFF state to ON state, and thereby the control for obtaining the light intensity of ¼ PWM and ½ PWM is attained. Specifically, while the above description defines the controlled light intensity as ⅛ PWM, ¼ PWM, ½ PWM and 1/1 PWM, they may also be defined as ¼ PWM, ½ PWM, 1/1 PWM and 1/1 PWM, or as ½ PWM, 1/1 PWM, 1/1 PWM and 1/1 PWM.

As described above, the mirror 212 may be controlled to operate with different resolutions for each subfield, thereby providing an image with higher levels of gray scale without requiring high speed data transmission.

Figure 20:
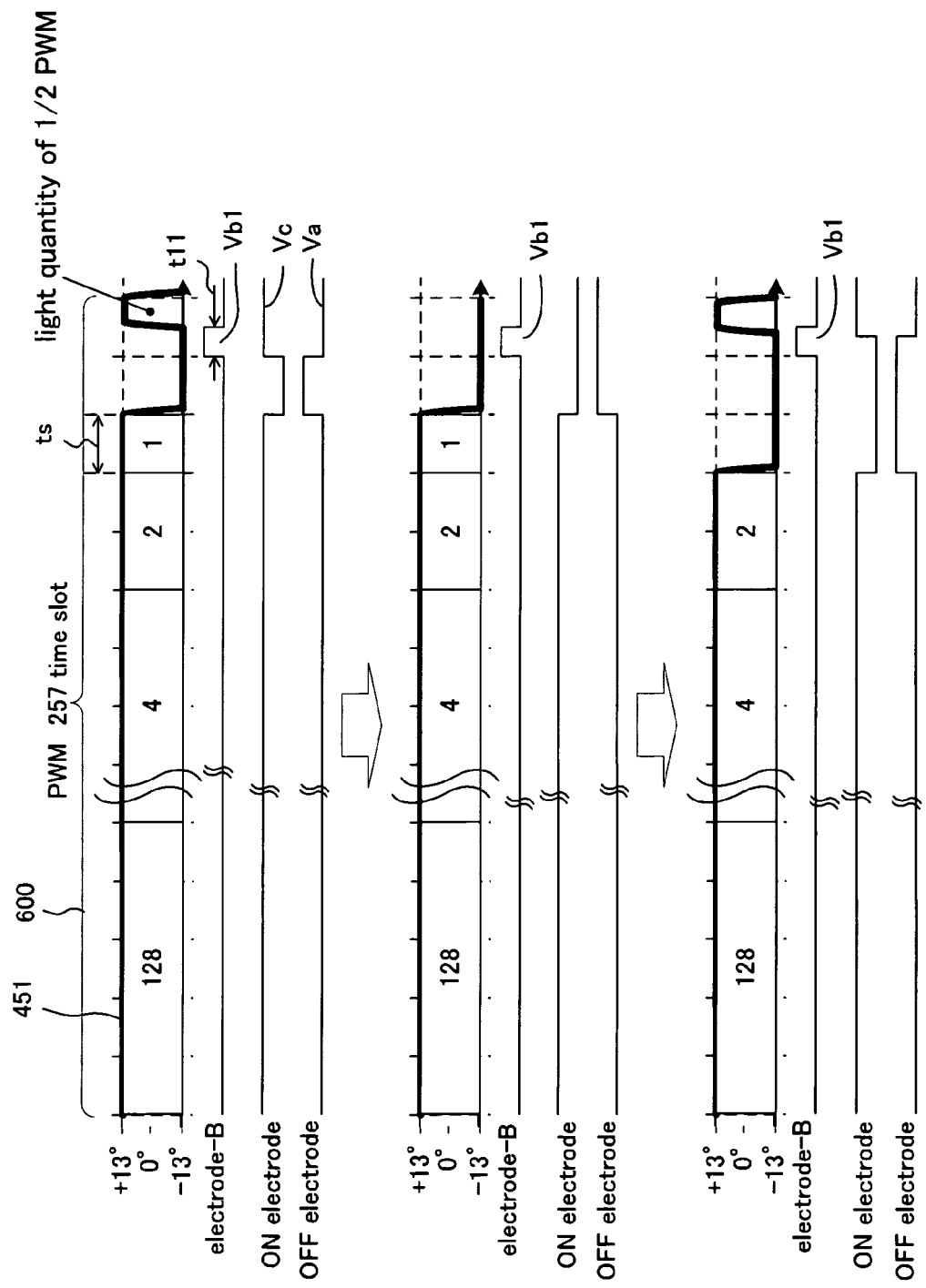
FIG. 20 is a timing diagram showing an exemplary method for improving a gray scale representation in a single subfield of the pixel unit of a spatial light modulator according to a preferred embodiment of the present invention.

FIG. 20 is a timing diagram showing an exemplary operation of a pixel unit 211 according to the present embodiment. FIG. 20 illustrates a method for increasing the number of gray scale levels by applying a binary PWM control in a single subfield.

This case illustrates an operation in which the operations of the ON electrode and OFF electrode are switched, which results from inverting the orientation of the incident light 511 in the configuration exemplified in FIG. 4 as the circuit configuration of the pixel unit 211.

When the mirror 212 is in the OFF state, even if the OFF electrode 215 and ON electrode 216, which are respectively connected to the memory cells M1 and M2 are shifted from (1, 0) to (0, 1), the OFF state of the mirror 212 is maintained for a predetermined period of time by means of the pulse Vb1 of the electrode D placed on the OFF side, whereas when the pulse Vb1 of the electrode D is turned to L, the mirror 212 is shifted to the ON side.

It is possible to control gray scale to have more levels than the gray scale control in units of time slots ts by making the light intensity obtained during the period of maintaining the pulse Vb1 of the electrode D lower than the controlled light intensity by means of PWM for the length of one time-slot.

Specifically, in the example of FIG. 20, the OFF state is maintained in the last time slot in a single subfield 600 by means of the pulse Vb1 of the electrode D, whereas the last time-slot is set at (0, 1) when a ½ PWM gray scale representation is not carried out.

In order to represent the ½/PWM, the immediate prior time slot is turned OFF. In a binary PWM, a gray scale control is carried out by combining the ON state and OFF state of a continuous multiple time slots ts on the basis of the weighting of each bit of a bit string assigned to the gray scale control, whereas the present exemplary operation is configured to add one extra time slot ts to the tail end of the subfield 600 and to set the pulse Vb1 (i.e., the pulse width t11 corresponding to ½ PWM) of the electrode D at the position of the tail-end time slot ts.

More specifically, FIG. 20 exemplifies the subfield 600 in the case of decreasing the light intensity by an increment of ½ PWM starting from the top.

Specifically, in FIG. 20, while the state is maintained by means of the pulse Vb1 of the electrode D in the last time slot ts, the placement of pulse Vb1 in the subfield 600 is arbitrary.

As described above, FIG. 20 shows an exemplary operation to achieve a gray scale of an image display with two times that of controlling gray scale in units of time slot ts.

Figure 21:
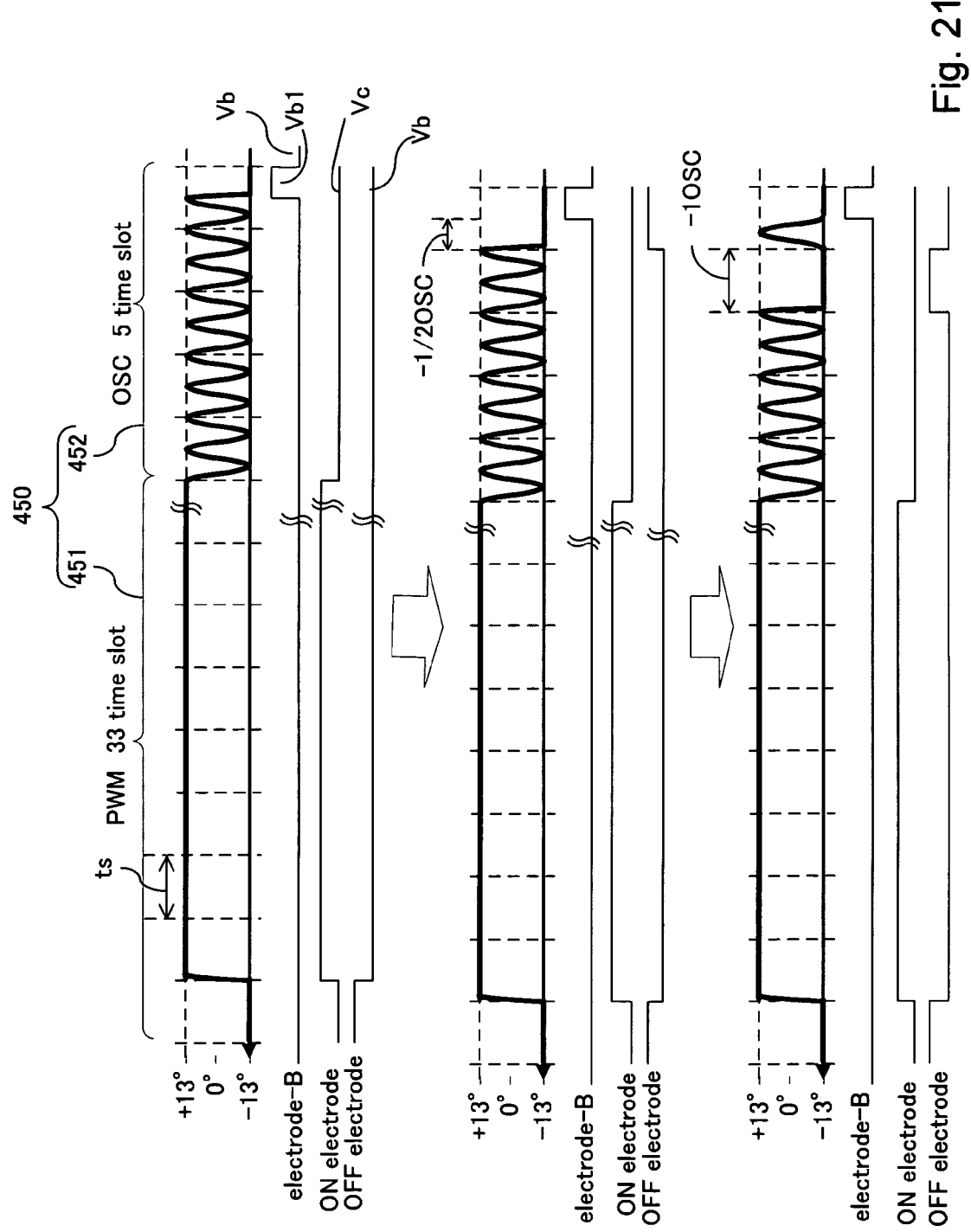
FIG. 21 is a timing diagram showing an exemplary method for improving a gray scale representation in a single subfield of the pixel unit of a spatial light modulator according to a preferred embodiment of the present invention.

FIG. 21 is a timing diagram showing an exemplary method of combining a non-binary PWM and an oscillation control for improving a gray scale representation in a single subfield.

The basic concept is the same as the exemplary operation shown in FIG. 20.

Furthermore, this case exemplifies an operation in which the operations of the ON electrode and OFF electrode are switched, which results from inverting the orientation of the incident light 511 in the configuration exemplified in FIG. 4 as the circuit configuration of the pixel unit 211.

In this case, a pulse Vb1 is set corresponding to the time slot ts at the tail end of an oscillation control pattern 452, when the mirror 212 is controlled by using a mirror control profile 450 obtained by combining the ON/OFF control pattern 451 and oscillation control pattern 452 within a single subfield 600.

In the pixel unit 211 where the mirror 212 is in the oscillation state, the mirror 212 can be changed to the OFF state by setting a pulse Vb1 to the voltage Vb of the electrode D placed on the OFF side even if the voltage applied to the OFF electrode 215 and ON electrode 216, which are connected to the memory cells M1 and M2, remains at (0, 0).

The number of gray scale levels can be increased by making the light intensity obtained while maintaining the pulse Vb1 lower than the OSC light intensity.

The example shown in FIG. 21 is configured to maintain the pulse Vb1 by means of the electrode D in the last time slot ts in one subfield 600, whereas the last time slot ts is maintained to be (0, 1) when a ½ OSC gray scale control is not used.

FIG. 21 exemplifies the case of sequentially decreasing the light intensity by the equivalent of ½ OSC from the top.

The example shown in FIG. 21 describes an example of shifting from the ON/OFF control pattern 451 (PWM) to the oscillation control pattern 452 (OSC) within the subfield 600; the same result will be obtained if a mirror control profile 450 shifting the oscillation control pattern 452 (OSC) to the ON/OFF control pattern 451 (PWM) within the subfield 600 is used and if the state is maintained by applying the pulse Vb1 to the electrode D in the first time-slot ts of the oscillation control pattern 452.

Figure 22:
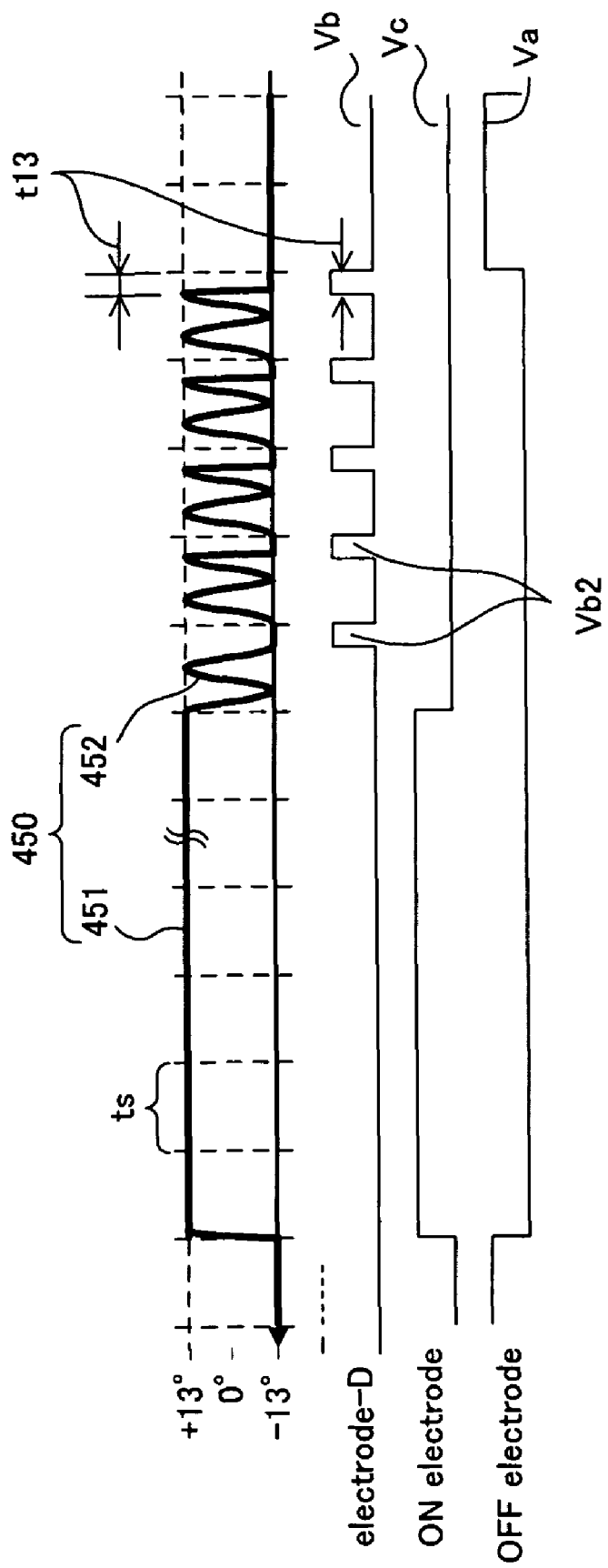
FIG. 22 is a timing diagram showing an exemplary operation for a spatial light modulator according to a preferred embodiment of the present invention.

FIG. 22 is a timing diagram showing another exemplary operation according to the present embodiment, in which a light intensity adjustment method in the oscillation state (OSC) of a mirror 212 is described.

This case illustrates an operation where the operations of the ON electrode and OFF electrode are switched, resulting from inverting the orientation of the incident light 511 in the configuration exemplified in FIG. 4 as the circuit configuration of the pixel unit 211.

When a gray scale control is carried out using, for example, the mirror control profile 450 that combines the ON/OFF control pattern 451 and oscillation control pattern 452, and if the number of assigned time slots ts of the oscillation control pattern 452 (OSC) is seven (7), the light intensity in one time-slot of the oscillation control pattern 452 (OSC) is preferred to be 12.5% (i.e., 12.5[%]*(7+1)=100[%]) of the light intensity that will be obtained in one time-slot ts of the ON/OFF control pattern 451 (PWM).

However, the light intensity may sometimes be more than 12.5% due to variations in the amplitude of the mirror 212 under the control of the oscillation control pattern 452 (OSC), variations in the optical system, or other variations. In such a case, the linearity of the gray scale represented by the mirror control profile 450 is damaged.

Accordingly, the exemplary operation shown in FIG. 22 is configured to provide a period in which the mirror 212 is maintained on the OFF side by means of the pulse Vb2 (in a pulse width t13) on the voltage Vb that is applied to electrode D placed on the OFF side, in each time slot ts during the period of a oscillation control pattern 452 (OSC) so as to control the light intensity obtained by the OSC during the period at 12.5%. Alternatively, the light intensity may be controlled at values that are the products of 12.5% times an odd number (i.e., 37.5%, 62.5% and 87.5%) so as to make a corresponding gray scale when an externally inputted video signal is converted into a video signal to be sent to the spatial light modulator 200 (i.e., the display panel).

As described above, when the number of time slots ts of the oscillation control pattern 452 (OSC) is set at seven (7), the light intensity of one time-slot of the OSC is preferred to be 12.5% of the light intensity of one time-slot of the PWM. However, when the number of time slots ts of the OSC is three (3), the light intensity is preferably 25%, and 6.5% when the number of time slots ts of the OSC is fifteen (15). These numbers may also be multiplied by odd numbers. This is especially necessary if the light intensity of one time-slot of the OSC is set at 6.5% (when there are fifteen time slots ts of the OSC) since there will be a large loss in light intensity, and therefore, in this case, it is better to use a value obtained by multiplication with an odd number.

FIG. 22 exemplifies the case of applying the pulse Vb2 of the electrode D in the last half of one time-slot of the oscillation control pattern 452 (OSC); alternatively, the pulse Vb2 may be applied in the first half.

Furthermore, while the example of FIG. 22 shows the ON/OFF control pattern 451 (PWM) followed by the oscillation control pattern 452 (OSC) in the mirror control profile 450; the operation will be the same if they are placed in reverse order, with the oscillation control pattern 452 (OSC) followed by the ON/OFF control pattern 451 (PWM).

The above described configuration makes it possible to attain a gray scale control with good linearity by appropriately setting both the position of the pulse Vb2 on a voltage Vb, which is applied to the electrode D, and a pulse width t13, even if there is non-linearity in the gray scale caused by a variation in the optical system or other causes. In other words, a gray scale control with good linearity can be attained without being affected by a variation in the production process for the pixel unit 211.

Figure 23:
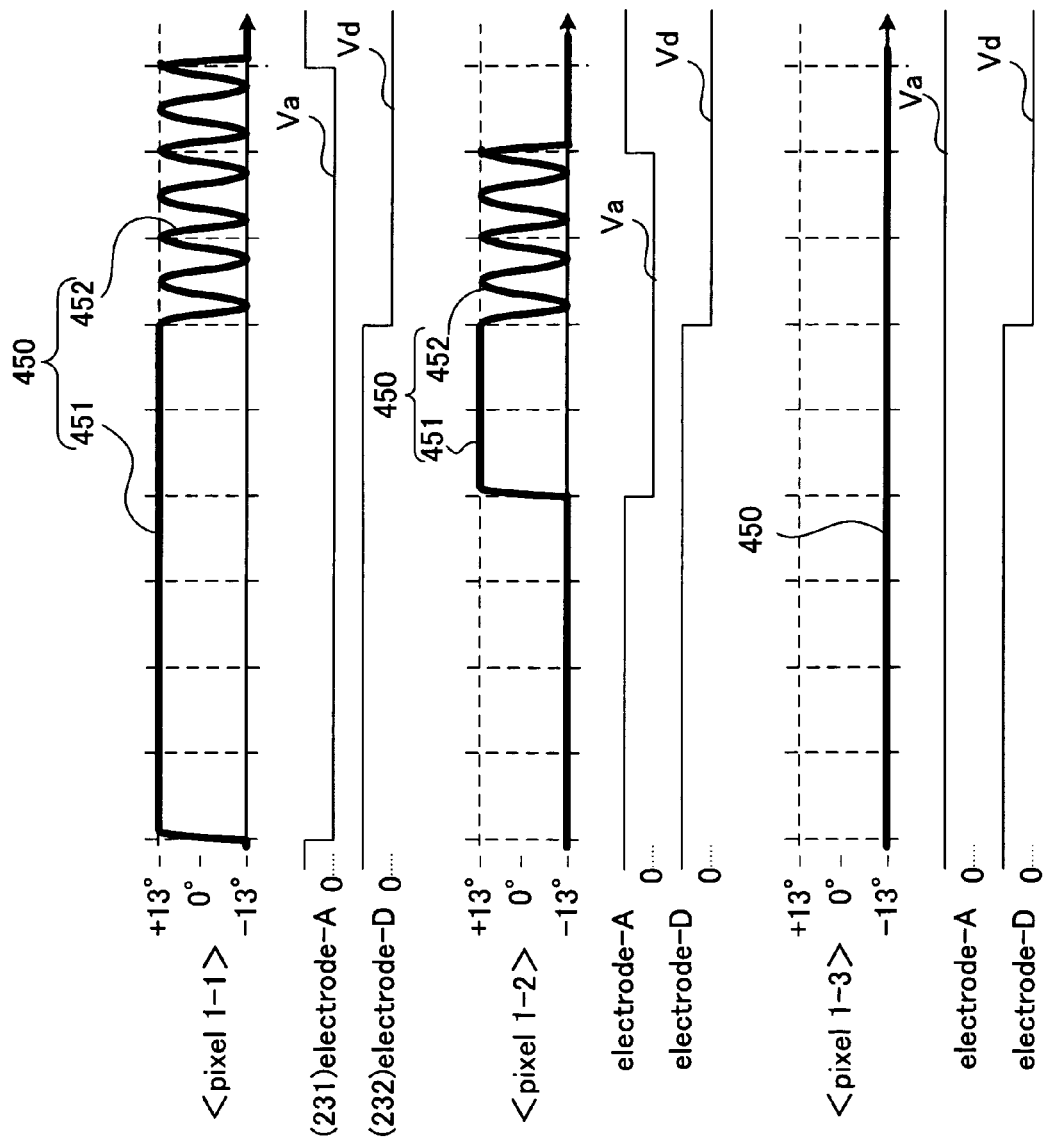
FIG. 23 is a timing diagram showing an exemplary control for the pixel unit configured as exemplified in FIG. 5.

FIG. 23 is a timing diagram showing an exemplary control of the pixel unit 211 configured as exemplified in FIG. 5. The circuit requires only one OFF capacitor 215b that can be placed in the entire area under the mirror 212 to increase the capacitance of the capacitor. This configuration makes it possible to attain an element structure that is robust against a voltage drop due to leakage and against voltage fluctuations due to a photoelectric effect.

As shown in FIG. 23, setting the value of the voltage Va of the electrode A to L (i.e., turning the memory cell M1 to L ("0")) for the number of time slots in accordance with a gray scale value to be displayed, starting from the mirror 212 being OFF (i.e., the voltage Va of the electrode A, and memory cell M1, at H ("1")) and in a state in which the voltage Vd of the electrode D on the ON side is maintained at H ("1"), the mirror 212 is turned to ON because the voltage Vd of the electrode D is at H.

At the start of the control period of the oscillation control pattern 452 (OSC), the voltage Vd of the electrode D is turned to L ("0") and the mirror 212 starts an oscillation (OSC). If the oscillation of the mirror 212 needs to be stopped, the value of the voltage Va of the electrode A is turned to H (i.e., the memory cell M1 is turned to H ("1")).

Furthermore, maintaining the voltage Va of the electrode A at H ("1") maintains the mirror 212 in the OFF state. The above description shows an exemplary configuration in which the electrode D is commonly connected in each ROW. Alternatively, the electrode D may be commonly connected to all pixels to turn them all simultaneously to the OFF state. It may also be configured such that the electrode D is fixedly to the ground potential (GND) and a voltage is applied to only the ON side of the mirror 212.

Figure 24:
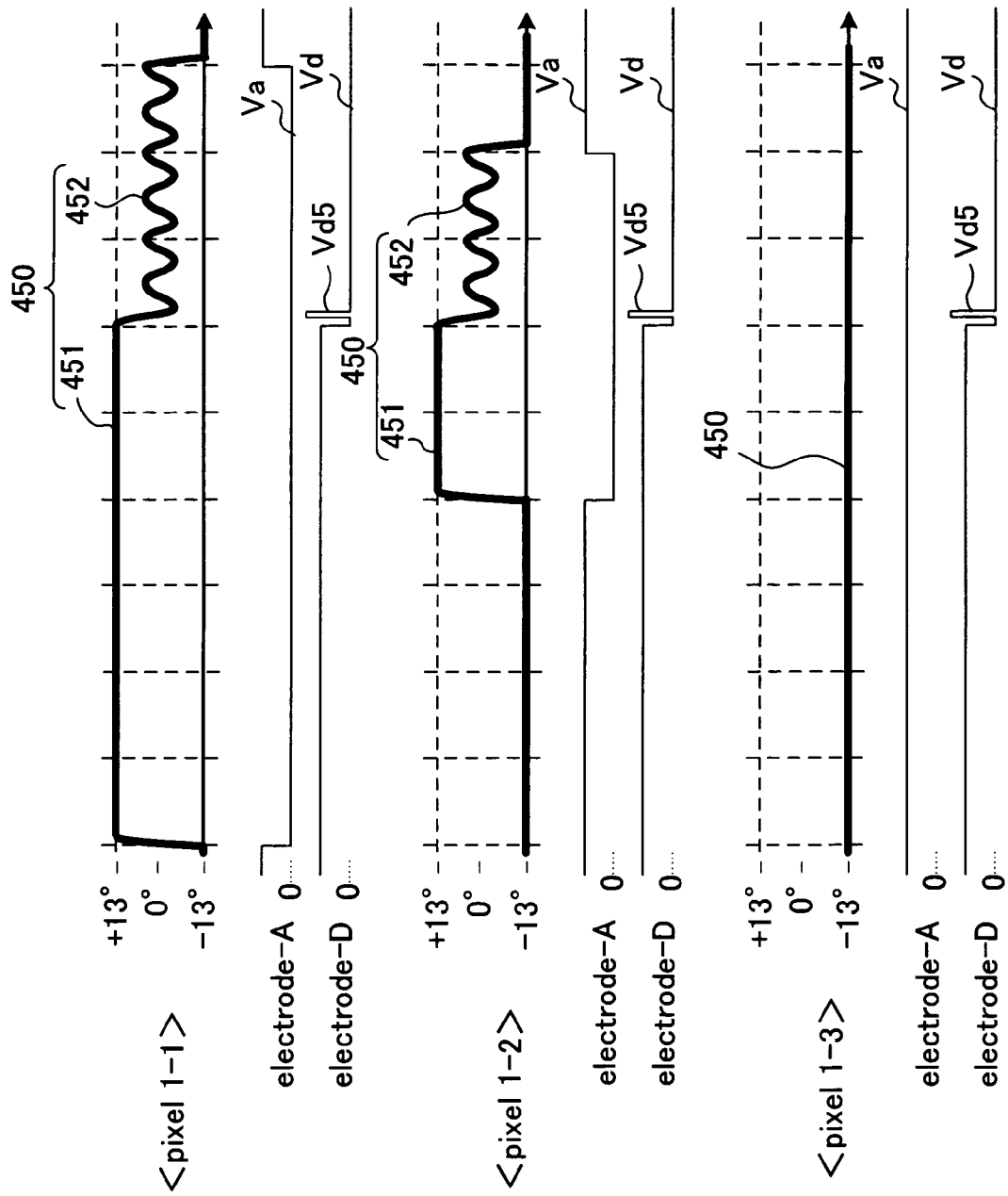
FIG. 24 is a timing diagram shown in an exemplary modification of the operation at the pixel unit configured as exemplified in FIG. 5.

FIG. 24 is a timing diagram showing an exemplary modification of the operation at the pixel unit configured as exemplified in FIG. 5.

FIG. 24 shows the waveform of a mirror control profile 450 when an intermediate oscillation is generated by using the electrode D.

Specifically, a pulse Vd5 is given to the voltage Vd of the electrode D to temporarily attract the mirror 212 to the ON side, while it is in transition to the OFF state from the ON state, immediately after the aforementioned voltage Vd is turned to L ("0") for shifting from the ON/OFF control pattern 451 to the oscillation control pattern 452. Thereby, an oscillation control pattern 452 produces an intermediate oscillation of smaller amplitude of the mirror 212.

Furthermore, by maintaining the voltage Va of the electrode A at H ("1"), the mirror 212 will be maintained in the OFF state even when a change including a pulse Vd5 is given to the voltage Vd of the electrode D.

Figure 25:
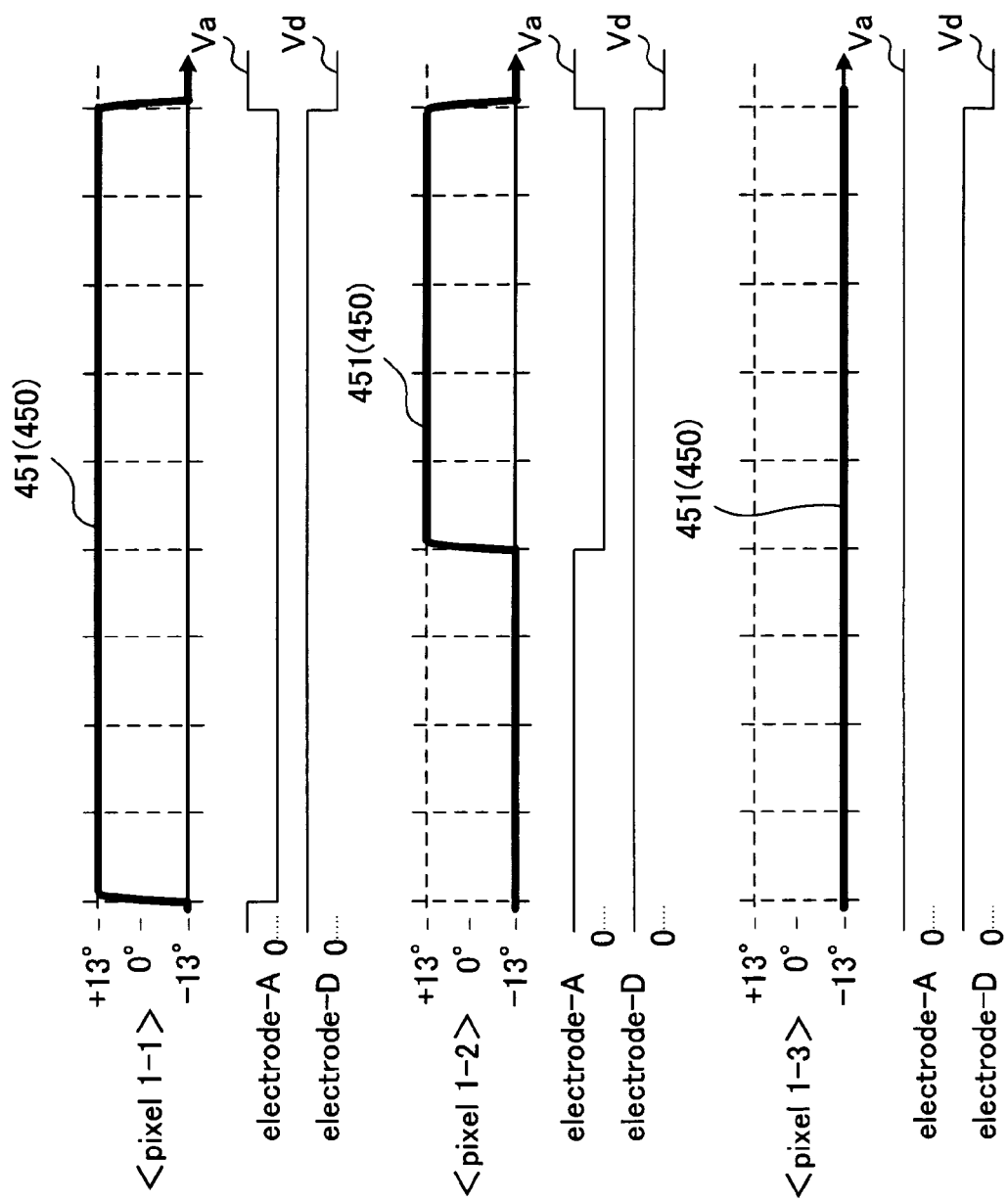
FIG. 25 is a timing diagram shown in an exemplary modification of the operation at the pixel unit configured as exemplified in FIG. 5.

FIG. 25 is a timing diagram shown in an exemplary modification of the operation at the pixel unit configured as exemplified in FIG. 5.

FIG. 25 exemplifies a waveform when a gray scale representation is carried out with a mirror control profile 450 constituted by a non-binary ON/OFF control pattern 451, not including an oscillation control (i.e., an OSC, full oscillation or intermediate oscillation) for the mirror 212.

In the case of FIG. 25, the control is such that either the voltage Va of the electrode A or the voltage Vd of the electrode D is turned to H ("1"), with the other turned to L ("0").

As such, the pixel unit 211 exemplified in FIG. 5 is configured to connect the electrode D on the ON side directly to the plate line 232 and eliminate the memory cell M2 and ON electrode 216 (i.e., the electrode C). Therefore, the configuration improves the production yield of the pixel array 210 (i.e., the spatial light modulator 200) since the number of circuit elements constituting the pixel unit 211 is decreased, as compared to a configuration with the memory cells M1 and M2 on the OFF side and ON side, respectively.

Furthermore, when the size of each pixel unit 211 is reduced and a larger number of pixel units 211 are arranged within a pixel array 210, the same size transistor (that is, with the same insulation withstand voltage performance), as a transistor constituting a memory cell M1 on the OFF side, can be placed independently of a reduced size of the pixel unit 211, and thereby it is possible to maintain, and improve, the reliability of the operation of the pixel unit 211 and spatial light modulator 200.

Furthermore, in this case, the size of the gate transistor 216c can be increased to improve the withstand voltage. A high drive voltage makes it possible to drive the mirror 212 at a higher speed and tilt the mirror 212 even when the hinge 213 is made more rigid as a countermeasure to stiction. By structuring the OFF capacitor 215b of the memory cell M1 with a poly-capacitor (i.e., a MOS capacitor) in place of an aluminum capacitor, it is possible to decrease the number of masks in the production process employing photolithography. Furthermore, for the same poly-capacitor, the voltage retention time of the memory cell M1 increases with the area size, enabling a low speed cycle for writing to the memory cell M1, reducing the necessary speed.

Figure 26A:
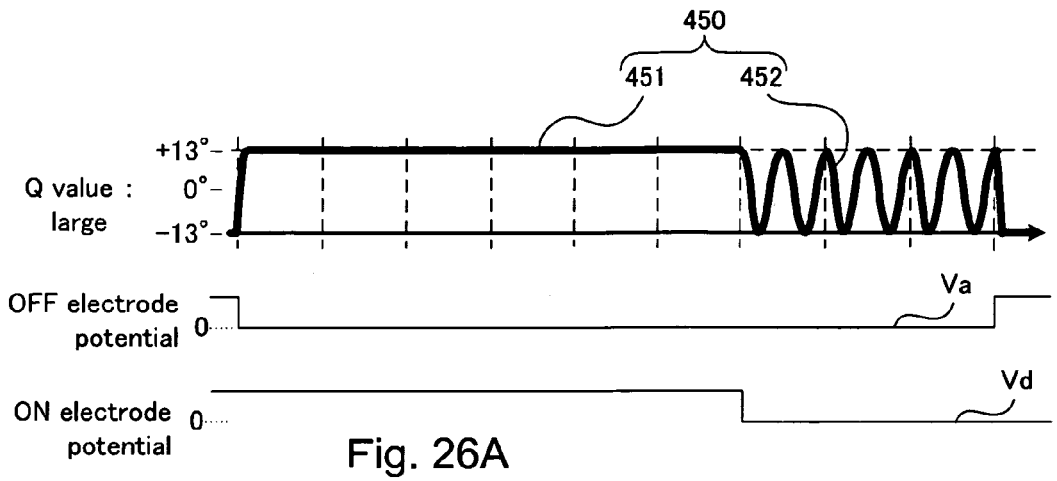
FIG. 26A is a diagram in the case of an oscillation not damping due to the oscillation characteristic of a hinge when a mirror is free-oscillated in an oscillation control for the mirror.
Figure 26B:
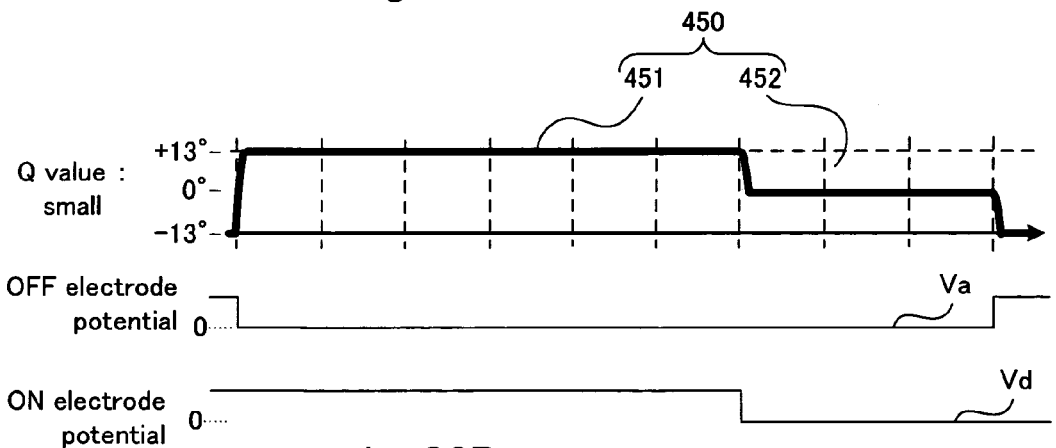
FIG. 26B is a diagram in the case of a mirror not oscillating at all due to the oscillation characteristic of a hinge and accordingly becoming a horizontal state when a mirror is free-oscillated in an oscillation control for the mirror.
Figure 26C:
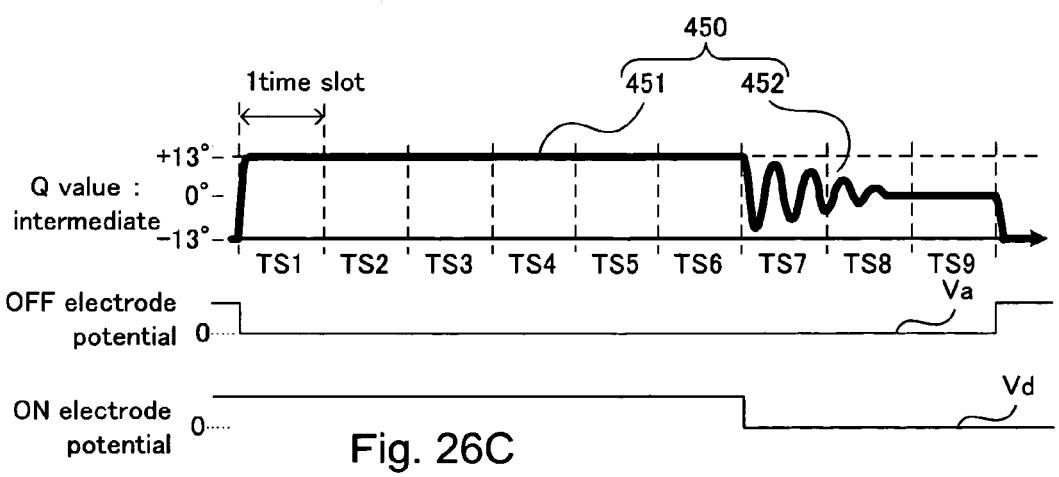
FIG. 26C is a diagram in the case of a mirror shifting from an oscillation state to a horizontal state due to the oscillation characteristic of a hinge when a mirror is free-oscillated in an oscillation control for the mirror.

FIGS. 26A, 26B and 26C show how a mirror oscillates when it is freely oscillated by making the potentials of an electrode and the mirror equal to each other after the mirror is stopped on the ON side, in the circuit exemplified in FIGS. 4 and 5.

There are, for example, cases in which the oscillation is not dampened, as shown in FIG. 26A. FIG. 26B shows the oscillation continuing for a while due to a dampening of the oscillation. FIG. 26C shows the mirror remaining in the horizontal state during the oscillation (OSC) period (i.e., the oscillation control pattern 452) due to certain oscillation factors (i.e., a quality factor value (Q value)).

Furthermore, in the case of FIG. 26C, the reflection light intensities are different among three time-slots, i.e., TS7, TS8 and TS9, constituting the OSC period. For example, the respective light intensities of the time slots TS7, TS8 and TS9 are 0.2, 0.15 and 0.1, where the light intensity of each of the time slots TS1 through TS6 of the PWM control, the ON/OFF control pattern 451, is defined as "1".

FIG. 26C shows the oscillation characteristic of the hinge 213 controlled in a plurality of sub-frames SF1 through SF4, the subfield 601 through subfield 604, as shown in FIG. 27 to obtain a high grade, approximately linear gray scale characteristic.

Specifically, FIG. 27 is a table of data including data of four sub-frames, in which whether or not each of the time slots TS1 through TS6 and time slots TS7 through TS9 of the ON/OFF control pattern 451 (that is, whether controlled under ON state or oscillation state) is used is shown in bits "1" and "0".

Furthermore, the total light intensity of the four sub-frames, subfield 601 (SF1) through subfield 604 (SF4), constituted by the combination between the ON/OFF control pattern 451, of which the time slots TS5 and TS6 at the tail end are "1" (which always requires turning ON for combining with the subsequent oscillation control), and the oscillation control pattern 452, of which the time slot TS7 at the start is "1" (which always requires turning ON for combining with an oscillation control), is controlled by a combination of bits that sequentially turns the two time-slots TS8 and TS9, which are nearby the end of each sub-frame, to OFF (i.e., "0") starting from the TS9 at the tail end of each sub-frame. Thereby, a linear gray scale can be attained even if the light intensities allocated to TS7, TS8 and TS9 are not the same as indicated in FIG. 26C.

Figure 28:
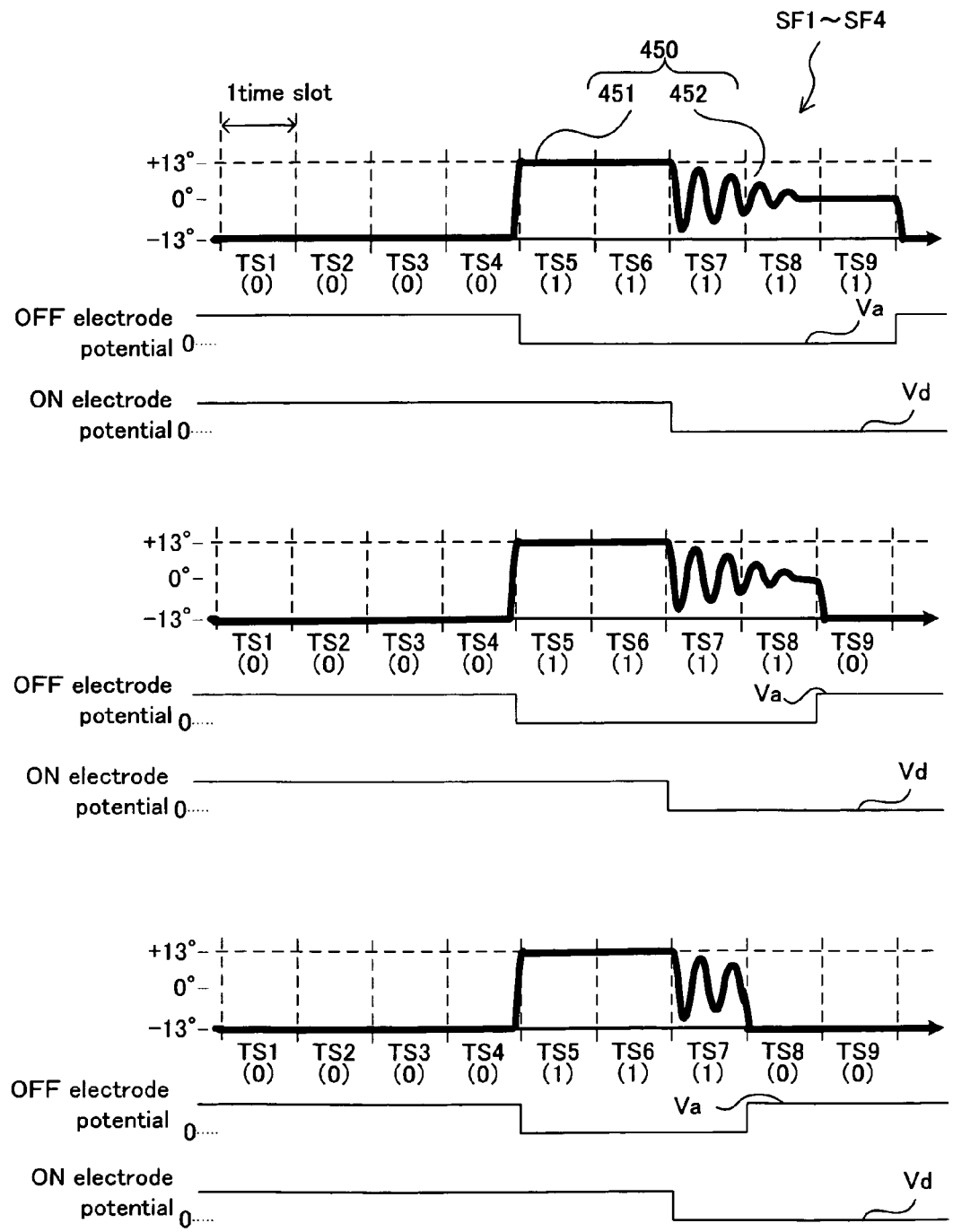
FIG. 28 is a timing diagram exemplifying a change in bits allocated to the time slot of the oscillation control pattern for a mirror and a change in the waveform of the present oscillation control pattern.

FIG. 28 exemplifies a change in bits allocated to the time slots TS7 through TS9 of the oscillation control pattern 452 and a change in the waveform of the oscillation control pattern 452.

As an example, in the case of FIG. 27, the time slots TS9 and TS8, near the respective tail ends of the four sub-frames (except TS7, adjacent to the ON/OFF control pattern 451 and always fixed to be ON), are sequentially changed from "1" to "0" to linearly change the total of reflection light intensities of four sub-frames as follows:

...

$9.8=2\times4+1.8$ $9.7=2\times4+1.7$ $9.55=2\times4+1.55$ $9.45=2\times4+1.45$ $9.3=2\times4+1.3$ $9.2=2\times4+1.2$ $9.05=2\times4+1.05$

..., and thereby a linear gray scale can be attained also in the case of FIG. 26C.

Specifically, a linear gray scale representation can be attained without being influenced by a variation in the oscillation characteristic of the mirror 212 and/or hinge 213 in the period of the oscillation control pattern 452.

In other words, a spatial light modulator 200 in which there is a large variation in the oscillation characteristic of the mirror 212 and/or hinge 213 can still be utilized, and thereby it is possible to reduce the need for precision in the production process, improving the production yield and reducing the production cost.

The present invention makes it possible to produce a spatial light modulator and mirror device with a reduced pixel size, improved performance, a low cost production process. The present invention makes possible a compact and high performance display device comprising the aforementioned spatial light modulator and mirror device.

Note that, the present invention may include embodiments in various manners possible and within the scope of the present invention. Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A display device comprising:
a plurality of pixel elements disposed on a substrate; and
a drive circuit corresponding to each of the pixel elements,
a first wire connected to the drive circuits along a horizontal direction constituting a ROW of the pixel elements wherein the first wire is disposed on a first layer as part of an integrated circuit (IC), and a second wire disposed on a second layer different from the first layer wherein the second wire is approximately overlapped and electrically connected to the first wire.

2. The display device according to claim 1, wherein:
the drive circuit includes a transistor comprising a gate; and
the gate in each of the pixel elements connected as a gate line constituting and functioning as the first wire.

3. The display device according to claim 1, wherein:
the first and second wires are interconnected through at least a connection point disposed in each of the pixel elements.

4. The display device according to claim 1, wherein:
the first wire and the second wired are provided to transmit signals for simultaneously controlling a plurality of pixel elements.

5. The display device according to claim 1, wherein:
the display device comprises a mirror device includes a micromirror in each of the pixel elements.

6. A mirror device, comprising:
a plurality of pixel elements disposed on a substrate as a pixel element array wherein each pixel element further comprises a micromirror;
each of the pixel elements includes a transistor and a capacitor for applying an electric signal thereon to control the micromirror to operate in a deflecting angle, wherein a pitch of the pixel element is less than or equal to 1.5 times an active area of the transistor in a longitudinal direction.

7. The mirror device according to claim 6, wherein:
the pixel element comprises at least two pieces of the transistors,
the capacitor has a Metal-Insulator-Metal (MIM) structure, and
a pitch of the pixel element is less than or equal to 9 micrometers.

8. The mirror device according to claim 6, wherein:
the pixel element comprises one piece of the transistor,
the capacitor has a poly-silicon plate, and
a pitch of the pixel elements is less than or equal to 9 micrometers.

9. A mirror device, comprising:
a plurality of pixel elements disposed on a substrate as a pixel element array wherein each of the pixel elements comprises a micromirror;
each of the pixel elements further comprises a transistor and a capacitor to receive signals for controlling a deflecting operation of the micromirror, wherein the pitch of the pixel elements is the same as a size of a field area of the transistor in a longitudinal direction or is two times a dimension of a cross section of the transistor.

10. The mirror device according to claim 9, wherein:
the pixel element comprises at least two pieces of the transistors,
the capacitor has a Metal-Insulator-Metal (MIM) structure, and
a pitch of the pixel elements is less than or equal to 9 micrometers.

11. The mirror device according to claim 9, wherein:
the pixel element comprises one piece of the transistor,
the capacitor has a poly-silicon plate, and
a pitch of the pixel elements is less than or equal to 9 micrometers.

12. A mirror device, comprising:
a plurality of pixel elements disposed on a substrate as a pixel element array wherein each of said pixel elements comprising a micromirror;
each of the pixel element further includes a transistor and a capacitor for receiving a signal to control a deflecting angle of the micromirror, wherein a sum of an area of a field area of the transistor and an area of a field area of the capacitor is greater than or equal to an area of the pixel element.

13. The mirror device according to claim 12, wherein:
the pixel element comprises at least two pieces of the transistors,
the capacitor has a Metal-Insulator-Metal (MIM) structure, and
a pitch of the pixel elements is less than or equal to 9 micrometers.

14. The mirror device according to claim 12, wherein:
the pixel element comprises one piece of the transistor,
the capacitor has a poly-silicon plate, and
a pitch of the pixel elements is less than or equal to 9 micrometers.

* * * * *